US012759258B2

(12) United States Patent
Rohrbach et al.

(10) Patent No.: US 12,759,258 B2
(45) Date of Patent: Oct. 13, 2026

(54) COMPOSITE SHEET MATERIAL

(71) Applicants: Fitesa High Point Inc., High Point, NC (US); Fitesa Germany GmbH, Peine (DE)

(72) Inventors: David Alan Rohrbach, Jamestown, NC (US); Ted Larry Clodfelter, High Point, NC (US); Gustavo Osorio, Hannover (DE)

(73) Assignees: Fitesa High Point Inc., High Point, NC (US); Fitesa Germany GmbH, Peine (DE)

(*) Notice: Subject to any disclaimer, the term of this patent is extended or adjusted under 35 U.S.C. 154(b) by 837 days.

(21) Appl. No.: 18/095,677

(22) Filed: Jan. 11, 2023

(65) Prior Publication Data

US 2023/0234326 A1 Jul. 27, 2023

Related U.S. Application Data

(60) Provisional application No. 63/298,506, filed on Jan. 11, 2022.

(51) Int. Cl.
*B32B 3/30* (2006.01)
*B32B 5/02* (2006.01)
*B32B 5/26* (2006.01)

(52) U.S. Cl.
CPC ................ *B32B 3/30* (2013.01); *B32B 5/022* (2013.01); *B32B 5/268* (2021.05);
(Continued)

(58) Field of Classification Search
CPC .......... B32B 3/30; B32B 5/268; B32B 5/022; B32B 2262/144; B32B 2250/03;
(Continued)

(56) References Cited

U.S. PATENT DOCUMENTS

2004/0115431 A1 6/2004 Chen et al.
2008/0287026 A1 11/2008 Chakravarty et al.
(Continued)

FOREIGN PATENT DOCUMENTS

JP 2020104270 A * 7/2020 .......... B41J 2/16552
WO 2015066300 A1 5/2015
(Continued)

OTHER PUBLICATIONS

"Hostapur SAS", Clariant, 2012, Slide 3, https://www.essentialingredients.com/pdf/HostapurSAS.pdf (Year: 2012).
(Continued)

*Primary Examiner* — Alicia J Weydemeyer
*Assistant Examiner* — Laura B Figg

(57) ABSTRACT

Provided is a composite sheet material including a nonwoven fabric having an outer exterior surface comprising a plurality of discreet, spaced-apart projections extending outwardly from the exterior surface. Collectively, the spaced-apart projections define a three-dimensional topography characterized by the plurality of spaced-apart projections and valleys disposed therebetween. The composite sheet material is particularly useful as a wiper instrument.

22 Claims, 11 Drawing Sheets

(52) U.S. Cl.
CPC ....... *B32B 2250/03* (2013.01); *B32B 2250/20* (2013.01); *B32B 2262/0253* (2013.01); *B32B 2262/144* (2021.05); *B32B 2307/538* (2013.01); *B32B 2307/718* (2013.01); *B32B 2432/00* (2013.01)

(58) Field of Classification Search
CPC ........ B32B 2250/20; B32B 2262/0253; B32B 2307/538; B32B 2307/718; B32B 2432/00
See application file for complete search history.

(56) References Cited

U.S. PATENT DOCUMENTS

| | | | |
|---|---|---|---|
| 2012/0177888 | A1 | 7/2012 | Escafere et al. |
| 2012/0237718 | A1 | 9/2012 | Weisman et al. |
| 2012/0315225 | A1 | 12/2012 | Porbeni et al. |
| 2014/0053870 | A1 | 2/2014 | Tuman et al. |
| 2015/0128364 | A1 | 5/2015 | Dooley et al. |
| 2016/0333509 | A1 | 11/2016 | Novarino et al. |
| 2017/0119599 | A1* | 5/2017 | Moinard ................ D04H 13/00 |
| 2020/0070473 | A1* | 3/2020 | Drews ..................... B32B 5/269 |
| 2021/0123188 | A1* | 4/2021 | McKee .................. D21H 27/38 |
| 2022/0009233 | A1* | 1/2022 | Atake .................. B41J 2/16552 |

FOREIGN PATENT DOCUMENTS

| | | | |
|---|---|---|---|
| WO | 2015073429 | A1 | 5/2015 |
| WO | 2015112844 | A1 | 7/2015 |

OTHER PUBLICATIONS

Bresee, et al. "Shot Development in Meltblown Webs". The Journal of the Textile Institute, vol. 89, No. 2, pp. 304-319 (Jan. 1, 1998).

* cited by examiner

COMPOSITE SHEET MATERIAL

CROSS REFERENCE TO RELATED APPLICATIONS

The present application claims priority of U.S. Provisional Application No. 63/298,506, filed Jan. 11, 2022, the contents of which are hereby incorporated by reference.

FIELD

The present invention relates generally to composite sheet materials for use as a wiping implement, and in particular to a composite sheet material having an exterior surface having a three-dimensional topography.

BACKGROUND

Abrasive cleaning pads and wipes are commonly used in many cleaning applications, including personal, home, commercial, and industrial applications. Traditionally, such cleaning pads and wipes include a layer having an abrasive material for removing so-called "stuck-on" materials that are difficult to remove, and an absorbent layer comprising an absorbent material, such as a sponge, foamed, or cellulose material.

Various materials have been developed having abrasive surfaces for removing difficult to remove materials. Unfortunately, many of these materials do not exhibit a good balance of abrasiveness and the ability to capture materials (e.g., fluids, dirt, dust, and debris) removed from the surface to be cleaned.

Accordingly, a need still exists to developed improved composite materials for cleaning surfaces.

SUMMARY

Certain embodiments of the invention are directed to a composite sheet material having a three dimensional topography comprising a plurality of spaced apart projections on a surface thereof. The spaced apart projections define a plurality of interconnected valleys disposed between the plurality of projections. Composite sheet materials in accordance with embodiments of the invention are particularly useful as a cleaning implement, such as hard surfaces.

In one embodiment, a composite sheet material suitable for use as a wipe is provide in which the composite sheet includes a first meltblown layer and second meltblown layer in which the first meltblown layer comprises an exterior surface characterized by a plurality of spaced-apart projections defining a three-dimensional topography characterized by the plurality of spaced-apart projections extending outwardly from said exterior surfaces and a plurality of valleys disposed therebetween.

In certain embodiments, the first and second meltblown layers comprise fine meltblown fibers. In some embodiments, the exterior surface of the first meltblown layer defines an abrasive surface of the composite sheet material.

In certain embodiments, the exterior surface of the first meltblown layer has a machine direction (MD) Arithmetic Average Roughness (Ra) ranging from about 100 to 500 μm, and in particular, from about 150 to 400 μm, and more particularly, from about 200 to 350 μm.

In some embodiments, the exterior surface of the first meltblown layer has a machine direction (MD) Roughness (Rz) ranging from about 600 to 1100 μm, and in particular, from about 700 to 1000 μm, and more particularly, from about 750 to 950 μm.

In certain embodiments, the exterior surface of the first meltblown layer has a cross direction (CD) Roughness (Ra) ranging from about 250 to 750 μm, and in particular, from about 300 to 600 μm, and more particularly, from about 350 to 550 μm.

In certain embodiments, the exterior surface of the first meltblown layer has a cross direction (CD) Roughness (Rz) ranging from about 800 to 1600 μm, and in particular, from about 1000 to 1550 μm, and more particularly, from about 1200 to 1500 μm.

In certain aspects of the invention, the first meltblown layer comprises a polypropylene polymer having a melt flow rate MFR ranging from about 400 to 650 g/10 min., and in particular, from about 400 to 600 g/10 min, and more particularly, from about 450 to 550 g/10 min.

In some embodiments, the second meltblown layer comprises a polypropylene polymer having a melt flow rate MFR ranging from about 1,100 to 2,000 g/10 min.

The projections may come in a variety of shapes and dimensions. For example, the projections may have a height ranging from about 0.5 to 2.5 mm., and a volume ranging from about 10 to 30 $mm^3$, such as from about 12 to 20 $mm^3$ or from about 15 to 18 $mm^3$.

In certain embodiments, number of projections per $m^2$ on the surface of the composite sheet may be from about 5,000 to 7,000.

In certain embodiments, the plurality of valleys are interconnected and define a surface void volume of the exterior surface of the first meltblown layer ranging from about 10 to 25 $mm^3$ per 100 $mm^2$, and in particular, from about 12 to 20 $mm^3$ per 100 $mm^2$, and more particularly, from about 50 to 20 $mm^3$ per 100 $mm^2$.

In a further aspect, the composite sheet material may include a functional layer disposed between the first and second meltblown layers. For example, the functional layer may comprise one or more of a spunbond layer, a meltblown layer, a carded nonwoven layer, an airlaid nonwoven layer, a conform layer, and combinations thereof.

In one embodiment, the functional layer comprises a composite having a spunbond/meltblown/spunbond configuration. In certain embodiments, the functional layer comprises a composite having a spunbond/spunbond/meltblown/meltblown/spunbond configuration. Other configurations of the functional layer may include spunbond//meltblown/meltblown/spunbond, spunbond/spunbond/meltblown/spunbond/spunbond, and the like.

In certain embodiments, one or more of the meltblown layers may predominately comprise polypropylene. In one embodiment, the structure of the composite sheet material is predominately polypropylene.

In certain embodiments, the exterior surface of the first meltblown layer exhibits an increase in surface area of at least 10% in comparison to an identical composite sheet that has not undergone a process of projections formation on a surface thereof. For example, an exterior surface of the first meltblown layer comprising the plurality of projections may exhibit an increase in surface area ranging from about 10 to 95% in comparison to an identical composite sheet that has not undergone a process of projections formation on a surface thereof.

In some embodiments, the basis weight of the composite sheet material is from about 15 grams per square meter ($g/m^2$) to 100 $g/m^2$, such as from about 20 to 80 $g/m^2$, 30 to 60 $g/m^2$, or from about 25 to 50 $g/m^2$.

In some embodiments, the composite sheet in accordance with the present invention may used to prepare a wiper cleaning implement.

A further aspect of the invention is directed to the use of the composite sheet material to prepare a cleaning wiper.

In a further aspect, a wiper is provided comprising a composite sheet material comprising of a first meltblown layer composed of a polypropylene resin having an MFR ranging from about 400 to 650 g/10 min., and in particular, from about 400 to 600 g/10 min, and more particularly, from about 450 to 550 g/10 min., and a second meltblown layer comprising a polypropylene resin having an MFR ranging from about 1,100 to 2,000 g/10 min., and wherein an exterior surface of the first meltblown layer exhibits a Shore Hardness A that is at least 10% greater than the Shore Hardness A of an exterior surface of the second meltblown layer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
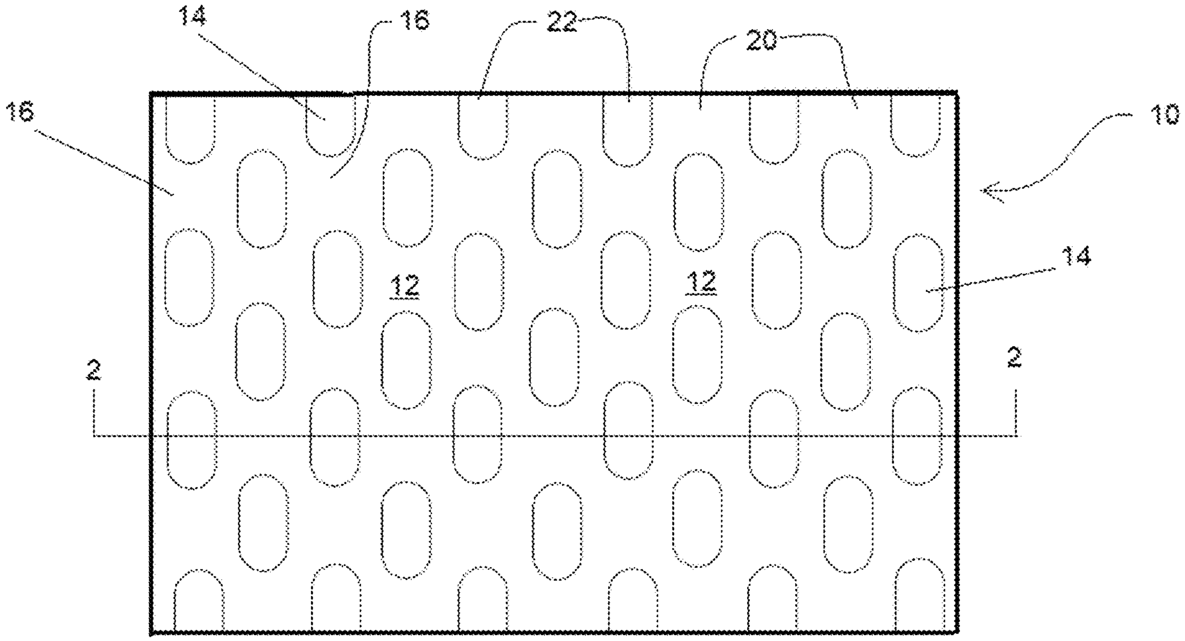
FIG. 1 is top view of a nonwoven fabric having a plurality of projections extending outwardly from a surface thereof that in accordance with at least one embodiment of the present invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

Definitions

For the purposes of the present application, the following terms shall have the following meanings:

The term "fiber" can refer to a fiber of finite length or a filament of infinite length.

The term "staple fiber" refers to a fibers of finite length. In general staple fibers may have a length from about 2 to 200 millimeters (mm).

As used herein, the term "monocomponent" refers to fibers formed from one polymer or formed from a single blend of polymers. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The at least two polymers can each independently be the same or different from each other, or be a blend of polymers. The polymers are arranged in substantially constantly positioned distinct zones across the cross-section of the fibers. The components may be arranged in any desired configuration, such as sheath-core, side-by-side, segmented pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and 6,200,669 to Marmon, et al., which are incorporated herein in their entirety by reference. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and 5,057,368 to Largman, et al., which are incorporated herein in their entirety by reference.

As used herein, the terms "nonwoven," "nonwoven web" and "nonwoven fabric" refer to a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "carded fabric" refers to a nonwoven fabric comprising staple fibers that are predominantly aligned and oriented in the machine direction using a carding process.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter. Thereafter, the meltblown fibers are carried by the gas stream and are deposited on a collecting surface to form a web of random meltblown fibers. Such a process is disclosed, for example, in U.S. Pat. No. 3,849,241 to Buntin et al.

As used herein, the term "machine direction" or "MD" refers to the direction of travel of the nonwoven web during manufacturing.

As used herein, the term "cross direction" or "CD" refers to a direction that is perpendicular to the machine direction and extends laterally across the width of the nonwoven web.

As used herein, the term "spunbond" refers to a process involving extruding a molten thermoplastic material as filaments from a plurality of fine, usually circular, capillaries of a spinneret, with the filaments then being attenuated and drawn mechanically or pneumatically. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692,613; 3,802,817; 4,405,297; and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a foraminous collection surface to form a web, and bonding the web of loose filaments into a nonwoven fabric. The bonding can be any thermal or chemical bonding treatment, with thermal point bonding being typical.

As used herein, the term "air through thermal bonding" involves passing a material such as one or more webs of fibers to be bonded through a stream of heated gas, such as air, in which the temperature of the heated gas is above the softening or melting temperature of at least one polymer component of the material being bonded. Air through thermal bonding may involve passing a material through a heated oven.

As used herein, the term "thermal point bonding" involves passing a material such as one or more webs of fibers to be bonded between a heated calender roll and an anvil roll. The calender roll is typically patterned so that the fabric is bonded in discrete point bond sites rather than being bonded across its entire surface.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

The term "composite", as used herein, may be a structure comprising two or more layers, such as a film layer and a fiber layer or a plurality of fiber layers joined together. The two layers of a composite structure may be joined together such that a substantial portion of their common X-Y plane interface are joined with each other.

Unless otherwise apparent from the context, the term "about" encompasses values within a standard margin of error of measurement (e.g., SEM) of a stated value or variations±0.5%, 1%, 5%, or 10% from a specified value.

Certain embodiments of the invention are directed to a sheet material comprising a nonwoven fabric having an outer exterior surface comprising a plurality of discreet, spaced-apart projections extending outwardly from the exterior surface. Collectively, the spaced-apart projections define a three-dimensional topography characterized by the plurality of spaced-apart projections and valleys disposed therebetween.

Sheet materials in accordance with one or more embodiments of the invention may be particularly useful in the manufacture of cleaning wipes, and in particular, wipes suitable for cleaning skin, surfaces and articles.

I. Nonwoven Fabric Having an Exterior Surface Comprising a Three-Dimensional Topography With reference to FIG. 1, a top view of a nonwoven fabric having an exterior surface with a three-dimensional topography is shown and broadly designated by reference character 10. FIG. 2 is a cross-sectional side view of the nonwoven fabric 10 taken along line 2-2 of FIG. 1. The nonwoven fabric includes a plurality of projections 14 that extend outwardly from an exterior surface 12 of the nonwoven fabric. The projections 14 are generally spaced-apart from adjacent projections and define discreet raised surfaces on the exterior surface of nonwoven fabric 10. The projections define a plurality of valleys 16 that are disposed between the projections. In the embodiment illustrated in FIGS. 1 and 2, the valleys 16 are interconnected to adjacent valleys.

Figure 2:
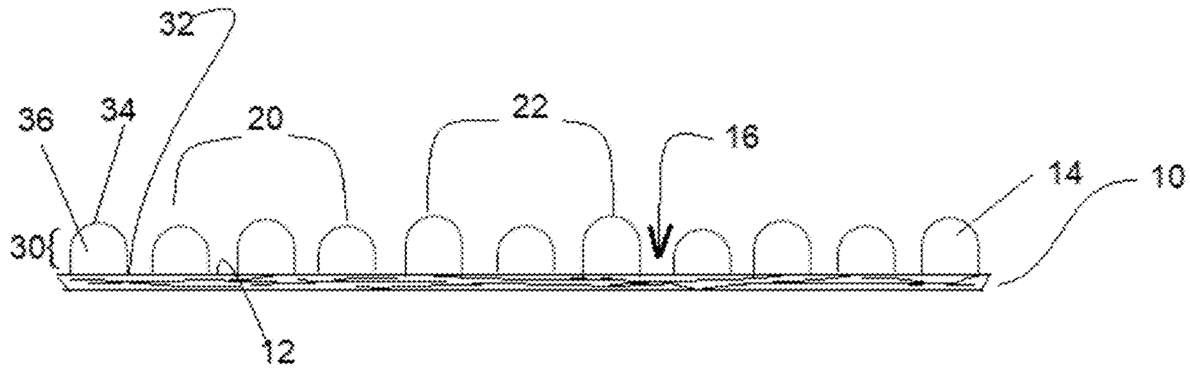
FIG. 2 is a cross-sectional side view of the nonwoven fabric taken along line 2-2 of FIG. 1.

In certain embodiments and as illustrated in FIGS. 1 and 2, the plurality of projections may be arranged in a plurality of rows comprising a first set of rows 20 a second set of rows 22 in which the first set of rows and second set of rows are arranged in an alternating pattern. In certain embodiments, the projections in the first set of rows are slightly offset (e.g., in the MD) from adjacent projections in the second set of rows. In other embodiments, the plurality of projections in adjacent rows may be substantially aligned with each other. In certain embodiments, the plurality of rows may extend in the machine direction, cross direction, or a direction that is not parallel to either the machine or cross directions of the nonwoven fabric 10.

As can best be seen in FIG. 2, each projection 14 has a height 30 measured between a base 32 and top surface 34 of the projection, and a continuous sidewall 36 that extends around the circumference or perimeter of the projection. The average height of the projections may range from about 0.5 to 2.5 mm, and in particular, from about 1.0 to 2.25 mm, and more particularly, from about 1.5 to 2.0 mm, with a range from about 1.85 to 2.15 being somewhat more preferred.

In certain embodiments, the projections 14 may have a length ranging from about 0.5 to 6 mm, such as from about 2 to 5 mm or from about 1.5 to 4 mm. In certain embodiments, the projections 14 may have a width ranging from about 0.2 to 4 mm, such as from about 0.5 to 3 mm or from about 1 to 2 mm.

In certain embodiments, the projections 14 may have a volume ranging from about 10 to 30 $mm^3$, such as from about 12 to 20 $mm^3$ or from about 15 to 18 $mm^3$.

In certain embodiments, the number of projections on the exterior surface of the nonwoven fabric per square meter is from about 1,000 to 480,000, and more typically, from about 2,000 to 50,000 $m^2$. In a certain embodiment, the number of projections per square meter is from about 4,000 to 10,000, such as from 5,000 to 7,000.

The projections may have a variety of different shapes including oval, circular, rectangular, square, pyramidal, polygonal, mushroom, and the like. In a preferred embodiment, the projections have an oval or rectangular shape.

The plurality of spaced apart projections and corresponding valleys collectively define a surface void volume defined by the space between the projections. The surface void volume helps to facilitate the ability of the nonwoven fabric to function as a wipe to pick up and capture materials, such as fluids and debris, from a surface or an object. In general, the larger the surface void volume, the greater amount of material (e.g., fluids, dust, dirt, and/or debris) that can be captured and held by the exterior surface 12 of the nonwoven fabric.

In certain embodiments, the nonwoven fabric 10 has a surface void volume that ranges from about 10 to 25 $mm^3$ per 100 $mm^2$, and in particular, from about 12 to 20 $mm^3$ per 100 $mm^2$, and more particularly, from about 50 to 20 $mm^3$ per 100 $mm^2$.

In some embodiments, the exterior surface 12 of the nonwoven fabric exhibits an increase in surface area of at least 10% in comparison to an identical nonwoven that has not undergone a projection forming process on a surface thereof.

In certain embodiments, the exterior surface 12 of nonwoven fabrics in accordance with the embodiments of the disclosure exhibited a machine direction (MD) Arithmetic Average Roughness (Ra) ranging from about 100 to 500 μm, and in particular, from about 150 to 400 μm, and more particularly, from about 200 to 350 μm. In certain embodiments, the exterior surface 12 of the nonwoven fabric exhibited a cross direction (CD) Arithmetic Average Roughness (Ra) ranging from about 250 to 750 μm, and in particular, from about 300 to 600 μm, and more particularly, from about 350 to 550 μm.

In certain embodiments, the exterior surface 12 of the nonwoven fabric exhibited a machine direction (MD) Rz roughness (average maximum peak to valley height within a single sampling length) ranging from about 600 to 1,100 μm, and in particular, from about 700 to 1,000 μm, and more particularly, from about 750 to 950 μm. In certain embodiments, the exterior surface 12 of the nonwoven fabric exhibited a cross direction (CD) Rz roughness (average maximum peak to valley height within a single sampling length) ranging from about 800 to 1600 μm, and in particular, from about 1000 to 1550 μm, and more particularly, from about 1200 to 1500 μm.

Surface Roughness values Ra and Rz may be determined with a 4K Ultra High-Accuracy Digital Microscope, VHX-7000 Series available from Keyence utilizing "VHX", Standard Keyence software, version 18.12.04.0A.

As discussed in greater detail below, the plurality of projections on the exterior surface of the nonwoven fabric may be produced with a projection forming process in which the nonwoven fabric is introduced between a pair of cooperating rolls in which one of the rolls includes a plurality of outwardly extending protuberances and the other roll includes a plurality of recesses that are configured and arranged to receive a corresponding protuberance therein. As the nonwoven fabric travels between the rolls, and the rolls rotate around their respective axes, discreet portions of the nonwoven fabric are engaged by outer surfaces of the protuberances, which are then inserted into the corresponding recesses along with the discreet portions of the nonwoven fabric. As a consequence, the discreet portions of the nonwoven fabric are stretched and elongated to thereby form the plurality of projections on the exterior surface of the nonwoven fabric.

In some embodiments, the pair of cooperating rolls are heated to an elevated temperature to soften the polymer of the nonwoven fabric so that it is more readily elongated while passing through the pairs of cooperating rolls. Generally, the pair of rolls are heated to or above the melting point of one or more of the nonwoven fabric.

Typically, the process of forming the plurality of projections results in an increase in surface area of the exterior surface of the nonwoven fabric. For example, the surface area of the exterior surface of the nonwoven fabric may be from about 30 to 60 $mm^2$, such as from about 30 to 55 $mm^2$, or from about 35 to 50 $mm^2$.

In certain embodiments, the exterior surface of the nonwoven fabric may exhibit an increase in surface area that is from 10 to 95%, and in particular, an increase in surface area that is from about 20 to 80%, and more particularly, and increase in surface area that is from about 40 to 50% in comparison to an identical nonwoven fabric that has not been subjected to the projection formation process.

In certain embodiments, the nonwoven fabric may exhibit an increase in liquid pick-up capacity that is from 2 to 100%, and in particular, and increase that is from about 20 to 80%, and more particularly, an increase in liquid pick-up capacity that is from about 40 to 50% in comparison to an identical nonwoven fabric that has not been subjected to the projection formation process.

In certain embodiments, the nonwoven fabric may exhibit a percent increase in liquid holding capacity that is from 25 to 150%, and in particular, a percent increase in liquid holding capacity that is from about 30 to 135%, and more particularly, an increase in liquid holding capacity that is from about 35 to 135% in comparison to an identical nonwoven fabric that has not been subjected to the projection formation process.

In certain embodiments, nonwoven fabrics in accordance with embodiments of the invention exhibit improvements in abrasion resistance and durability in comparison to an identical nonwoven fabric that has not been subjected to the projection formation process. In certain embodiments, nonwoven fabrics in accordance with embodiments of the invention exhibit 0% fiber loss when subjected to Abrasion Testing.

In a preferred embodiment, the nonwoven fabric 10 having exterior surface 12 comprises a meltblown nonwoven fabric.

A wide variety of different wiping articles can be prepared using nonwoven fabric 10. Examples of such wiping articles include cleaning wipes for use in cleaning applications, such as, cleaning, disinfecting, or treating a surface such as dishes, surfaces for preparing food, cooking surfaces, the floor, and all hard surfaces cleaning and disinfecting.

In some embodiments, the wiping articles may be used as a personal wiper, such as facial and cosmetic wipes, baby wipes, hand wipes, and the like.

In some embodiments, it may be desirable to use the cleaning wipe with a cleaning composition, such as liquid cleaning composition. In this regard, the cleaning wipe may be provided in a packaged form in which the cleaning wipe is impregnated with a cleaning composition. In other embodiments, the cleaning composition may be added by the end user. Non-limiting examples of formulations that may be used with the cleaning wipes are taught by Truong et al in U.S. 2015/0373970 Antimicrobial Compositions, Wipes, and Methods as well as by Chen et al. in U.S. 2005/0136772, the contents of both which are hereby incorporated by reference.

In addition, the basis weight of the cleaning wipe may be selected based on the desired end use of the cleaning wipe. In one embodiment, the cleaning wipe may have a basis weight ranging from about 15 grams per square meter ($g/m^2$) to 100 $g/m^2$. For other applications, a preferred range may be from about 20 to 80 $g/m^2$, and in still other embodiments, the cleaning wipe may have a basis weight ranging from about 30 to 60 $g/m^2$. Finally in other embodiments, a basis weight from 25 to 50 $g/m^2$ may be preferred.

II. Representative Examples of Composite Sheets Comprising a Nonwoven Layer Having a Three-Dimensional Topography A. Composite Sheet Comprising Two Fine Exterior Meltblown Layers With reference to FIG. 4, a composite sheet material consisting of two meltblown layers is shown, and broadly designated by reference character 50. In the illustrated embodiment, the composite sheet material 50 comprises a first meltblown layer 54 and a second meltblown layer 52 that are joined together along interface 58. The composite sheet material 50 includes a first outer exterior surface 12, which is also the exterior surface of meltblown layer 52, and a second outer exterior surface 56, which also an exterior surface of meltblown layer 54.

As in the nonwoven fabric 10, discussed previously, the exterior surface 12 of the composite sheet material 50 includes a plurality of spaced apart projections 14 that extend outwardly from the exterior surface 12 of the composite sheet material 50. The plurality of projections 14 collectively define a plurality of interconnected valleys 16 disposed between the plurality of projections defining a surface void volume of the exterior surface 12.

In certain embodiments, the first and second meltblown layer 52, 54 may comprise fine meltblown fibers. As used herein, the term "fine meltblown fibers" refers to fibers having a diameter ranging from about 0.5 to 10 μm, and in particular, from about 1 to 6 μm, and more particularly, from about 2 to 5 μm. It has generally been observed that fine meltblown fibers having diameters of less than 10 μm typically results in the exterior surface of the nonwoven fabric having a softer feel.

In certain embodiments, it has been found that polypropylene polymer resins having melt flow rates 1,100 to 2,000 g/10 min., and in particular, from about 1,500 to 1,800/10 min. are particularly useful for forming fine meltblown fibers. The melt flow rate (MFR) of a polymer resin may be determined in accordance with ASTM D1238.

Examples of suitable polypropylenes include homopolymer polypropylenes, Ziegler-Natta catalyzed polypropylenes, metallocene catalyzed polypropylenes, and blends thereof. Suitable polypropylenes for preparing fine meltblown fibers may be obtained from ExxonMobil, such as ACHEIVE™ pp 6936G2 (a metallocene catalyzed homopolymer polypropylene having an MFR of 1,550 g/10 min.); Total Petrochemicals and Refining USA, Inc. of La Port, TX, 77571 USA as grade 3962 (having an MFR of 1,300 g/10 min.); and LyondellBasell under the product name METOCENE™ MF650Y (a metallocene catalyzed polypropylene homopolymer having an MFR of 1,800 g/10 min.). In one embodiment, the meltblown fibers may comprise a blend of PLA and polypropylene that has been reclaimed from spunbond bicomponent fibers comprised of PP/PLA using the process taught in International Application PCT/US 2015/012658.

In addition to polypropylene, other polymers resins may be used to prepare to prepare fine meltblown fibers including polyolefins, such as polyethylene, and copolymers thereof, polyesters, such as polyethylene terephthalate (PET), polytrimethylene terephthalate (PTT), and polybutylene terephthalate (PBT), polyamides, such as nylons, polystyrenes, copolymers, and blends thereof, and other synthetic polymers that may be used in the preparation of fine meltblown fibers. In addition, polymers having elastomeric properties may be used in certain embodiments, such as polypropylene copolymers available under the Vistamaxx product name available from ExxonMobil.

In addition, bio-based composite sheets may be prepared using bio-based polymers, such as aliphatic polyesters, which includes polylactic acid polymers. Examples of bio-based polymers that may be used in certain embodiments of the invention are discussed in greater detail below.

In certain embodiments, the composite sheet 50 may have a basis weight ranging from 20 to 100 g/m$^2$, such as from about 25 to 60 g/m$^2$ or from about 30 to 40 g/m$^2$. The weight ratio of the first meltblown layer 54 to the second meltblown layer 52 may range from 20:80 to 80:20, and in particular, from 40:60 to 60:40. In certain embodiments, the weight ratio of the first meltblown layer 54 to the second meltblown layer 52 is 50:50.

The thickness of the composite sheet material 50 typically ranges from about 0.5 to 5 mm, and in particular, from about 1 to 3 mm.

In some embodiments, the composite sheet may be subjected to a bonding step. The fibers of the first and second meltblown layer 52, 54 may be bonded to adjacent fibers using thermal, ultrasonic, mechanical, and adhesive bonding. In some embodiments, the meltblown layers may be thermally bonded using a calender bonding unit having a cylindrical roll having bond points arranged in a pattern or randomly arranged on a surface thereof. The bond points are generally heated to a temperature that is above the softening or melting temperature of at least one polymer component of the composite sheet.

The bond points can have a variety of patterns including circular, oval, oval elliptical, square, rectangular, square, diamond, rod (including CD and MD rod), and the like. The percent bonding area of the composite sheet may range from about 4 to 30%, based on the total surface area of the composite sheet, and in particular, from about 10 to 24%, and more particularly, from 10 to 16%, based on the total surface area of the composite sheet.

In certain embodiments, the first and second meltblown layer 52, 54 are thermally bonded by passing the layers through a thermal bonding unit in which the composite sheet 50 is subjected to a heated gas, such as air, at a temperature above the melting point of at least one polymeric material of the composite sheet. In one such embodiment, the composite sheet is passed through an air through thermal bonding unit in which a stream of heated gas, such as air, is above the temperature of the softening or melting temperature of at least one polymer component of the composite sheet.

In certain embodiments, the composite sheet material 50 exhibits an increase in caliper following the projection forming process of about 50 to 350% in comparison to the identical material that has not been subjected to the projection forming process. In particular, the composite sheet material 50 may exhibits an increase in caliper of about 150 to 350%, and more particularly, from about 200 to 300% in comparison to the identical material that has not been subjected to the projection forming process.

In certain embodiments, the composite sheet material 50 exhibits an increase in surface area following the projection forming process of about 15 to 150% in comparison to the identical material that has not been subjected to the projection forming process. In particular, the composite sheet material 50 may exhibits an increase in surface area of about 25 to 75%, and more particularly, from about 40 to 60% in comparison to the identical material that has not been subjected to the projection forming process.

B. Composite Sheet Comprising Two Exterior Fine Meltblown Layers and an Internal Functional Layer With reference to FIG. 4, a composite sheet material comprising two meltblown layers and an internal functional layer is shown, and broadly designated by reference character 60. In the illustrated embodiment, the composite sheet material 60 comprises a first meltblown layer 54 and a second meltblown layer 52 and a functional layer 62 sandwiched therebetween. The functional layer 62 may provide additional functional properties, such as absorbency, strength, integrity, or the like to the composite sheet material 60. The composite sheet material 60 includes a first outer exterior surface 12, which is also the exterior surface of meltblown layer 52, and a second outer exterior surface 56, which also an exterior surface of meltblown layer 54.

As in the nonwoven fabric 10, discussed previously, the exterior surface 12 of the composite sheet material 60 includes a plurality of spaced apart projections 14 that extend outwardly from the exterior surface 12 of the composite sheet material 60. The plurality of projections 14 collectively define a plurality of interconnected valleys 16 disposed between the plurality of projections defining a surface void volume of the exterior surface 12.

In certain embodiments, the first and second meltblown layer 52, 54 may comprise fine meltblown fibers. As discussed previously, fine meltblown fibers generally have diameters ranging from about 0.5 to 10 μm, and in particular, from about 1 to 6 μm, and more particularly, from about 2 to 5 μm. Suitable materials for preparing a fine meltblown fibers are discussed previously.

In certain embodiments, the functional layer may comprise a nonwoven fabric. Suitable examples of nonwoven fabrics for the functional layer include spunbond nonwovens, spunlace nonwovens, meltblown nonwovens, carded nonwovens, airlaid nonwovens, resin bonded nonwovens, and the like, and combinations thereof. In accordance with certain embodiments, the functional layer may comprise a composite nonwoven fabric having a spunbond/meltblown/spunbond configuration, which is also referred to as an SMS composite fabric. One example of an SMS composite fabric has the following structure spunbond/spunbond/meltblown/meltblown/spunbond, which is also referred to as an SSMMS composite fabric.

In one embodiment of the invention, the functional layer 62 comprises at least one spunbond nonwoven fabric comprising a plurality of continuous or semi-continuous filaments that are bonded together to form a coherent web.

In certain embodiments, the functional layer may comprise a composite nonwoven fabric comprising a blend of cellulose fibers (e.g., wood pulp or bamboo pulp) and staple or meltblown fibers.

In a preferred embodiment of the composite sheet material, the first meltblown layer 54 and a second meltblown layer 52 both comprise polypropylene meltblown fine fibers, and the functional layer comprises an SMS composite fabric having an SSMMS structure in which the SMS comprise polypropylene.

In certain embodiments, the basis weight of the functional layer 62 may range from about 8 to 96 $g/m^2$, and in particular, from about 10 to 20 $g/m^2$, and more typically, from about 11 to 15 $g/m^2$.

The thickness of the functional layer 62 may range from about 0.1 to 5 mm, and in particular, from about 0.4 to 3 mm, and more typically, from about 0.6 to 2 mm.

The basis weight of the composite sheet material 60 may range from about 15 to 100 grams per square meter ($g/m^2$), and in particular, from about 20 to 80 $g/m^2$, and more particularly, from about 25 to 60 $g/m^2$. In a preferred embodiment, the composite sheet has a basis weight that is about 30 to 50 $g/m^2$.

The thickness of composite sheet material 60 may range from about to 0.5 to 2.5 mm, and in particular, from about 0.8 to 2.0 mm, and more particularly, from about 1.2 to 1.5 mm. In a preferred embodiment, the composite sheet material 70 has a thickness that is about 1.3 to 1.4 mm.

In certain embodiments, the composite sheet material 60 exhibits an increase in caliper following the projection forming process of about 25 to 400% in comparison to the identical material that has not been subjected to the projection forming process. In particular, the composite sheet material 60 may exhibits an increase in caliper of about 100 to 350%, and more particularly, from about 250 to 325% in comparison to the identical material that has not been subjected to the projection forming process.

In certain embodiments, the composite sheet material 60 exhibits an increase in surface area following the projection forming process of about 10 to 60% in comparison to the identical material that has not been subjected to the projection forming process. In particular, the composite sheet material 60 may exhibit an increase in surface area of about 20 to 40%, and more particularly, from about 24 to 30% in comparison to the identical material that has not been subjected to the projection forming process.

In some embodiments, the composite sheet material 60 may be subjected to a bonding step. The fibers of the first and second meltblown layer 52, 54 may be bonded to adjacent fibers using thermal, ultrasonic, mechanical, and adhesive bonding. In some embodiments, the composite sheet material 60 may be thermally bonded using a calender bonding unit having a cylindrical roll having bond points arranged in a pattern or randomly arranged on a surface thereof. The bond points are generally heated to a temperature that is above the softening or melting temperature of at least one polymer component of the composite sheet material.

The bond points can have a variety of patterns including circular, oval, oval elliptical, square, rectangular, square, diamond, rod (including CD and MD rod), and the like. The percent bonding area of the composite sheet may range from about 4 to 30%, based on the total surface area of the composite sheet, and in particular, from about 10 to 24%, and more particularly, from 10 to 16%, based on the total surface area of the composite sheet material.

In certain embodiments, the first and second meltblown layer 52, 54 are thermally bonded by passing the layers through a thermal bonding unit in which the composite sheet material 60 is subjected to a heated gas, such as air, at a temperature above the melting point of at least one polymeric material of the composite sheet. In one such embodiment, the composite sheet is passed through an air through thermal bonding unit in which a stream of heated gas, such as air, is above the temperature of the softening or melting temperature of at least one polymer component of the composite sheet material 60.

Figure 5:
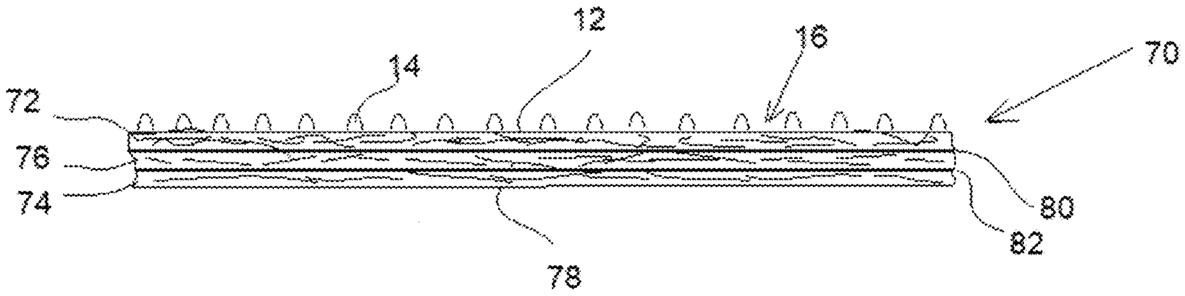
FIG. 5 is a cross-sectional side view of a composite sheet in accordance with at least one embodiment of the present invention.

C. Dual Texture Composite Sheet Comprising an Exterior Abrasive Meltblown Layer and an Exterior Fine Meltblown Layer With reference to FIG. 5, a further embodiment of a composite sheet material comprising two meltblown layers and an internal functional layer is shown, and broadly designated by reference character 70. In the illustrated embodiment, the composite sheet includes a first external surface 78 having a first texture and second external surface 12 having a second texture in which the first texture is different than the first texture. In certain embodiments, the first texture has a softer feel while the second texture is more coarse/rough and is relatively harder than the first texture.

In certain embodiments, the composite sheet material 70 comprises a first meltblown layer 72 and a second meltblown layer 74 and a functional layer 76 sandwiched therebetween. As discussed previously, the functional layer 76 may provide additional functional properties, such as absorbency, strength, integrity, and the like to the composite sheet material 70. The composite sheet material 70 includes a first outer exterior surface 12, which is also defines an exterior surface of meltblown layer 72, and a second outer exterior surface 78, which also defines an opposite exterior surface of meltblown layer 74.

As in the nonwoven fabric 10, discussed previously, the exterior surface 12 of the composite sheet material 70 includes a plurality of spaced apart projections 14 that extend outwardly from the exterior surface 12 of the composite sheet material 70. The plurality of projections 14 collectively define a plurality of interconnected valleys 16 disposed between the plurality of projections defining a surface void volume of the exterior surface 12.

In certain embodiments, the first meltblown layer 72 comprising the plurality of projections 14 defines an abrasive layer having a rougher texture that is particularly adapted for removing materials that are more tightly adhered to a surface.

As discussed in greater detail below, first meltblown layer 72 may be prepared using meltblown process conditions that increase the abrasiveness and roughness of the resulting exterior surface 12 of the meltblown layer as it is deposited onto the underlying functional layer 76. For example, the meltblowing process may be adjusted to introduce one or more of roping of the meltblown fibers and the production of shot and fly. Typically, the exterior surface may include a plurality of abrasive structures (in addition to the plurality of projections) comprising 1) conglomerated fibers in which multiple fibers are joined, married, or otherwise fused to adjacent fibers, 2) meltblown shot, 3) fibers having average diameters greater than 4 micrometers and 4) fibers having a tortuous geometry in which the fibers are characterized as having twists, kinks, coils, loops, and the like.

Generally, in the manufacture of conventional meltblown materials, high velocity air is typically used to attenuate the polymeric strands to create fine, thin fibers. In embodiments of the present invention, a meltblown layer having increased abrasiveness may be created by adjusting one or more of the meltblown process conditions, such as air temperature, air volume, distance of the spinnerets to the web collection surface, and the like to thereby produce abrasive structures on the exterior surface 12 of the meltblown layer. For example, in one embodiment, an abrasive meltblown layer may be produced by adjusting conditions of the air flow system, such as by increasing the air flow area or otherwise decreasing the velocity of the air stream immediately adjacent the molten polymeric strands as they emerge from the meltblown die head. By adjusting the air flow it is possible to prevent or retard substantial attenuation of the fiber diameter (or reduce the degree of fiber attenuation), which may increase fiber coarseness, which may then increase the abrasiveness of the layer formed by the fibers.

In addition, process conditions, such as airflow, may be used to create so-called "shot" within the meltblown layer. Shot refers to portions of the web where individual meltblown fibers have combined or conglomerated during the meltblown process to produce large, uneven globules of polymer within the meltblown web. In conventional meltblowing processes, the presence of shot would be highly undesirable. However, in the present invention, the shot may help produce increased abrasiveness and roughness in the meltblown web. In some embodiments, airflow near the die exit may be used to agitate and spread the polymeric fibers in a manner that may be highly non-uniform on the forming belt. The large degree of non-uniformity of the lay-down of coarse meltblown fibers may result in forming a meltblown web having variations in thickness and variations in basis weight across the surface of the web, i.e., an uneven surface may be created on the layer, which may increase the abrasiveness of the layer formed by the fibers.

Further, non-uniform spread of the fibers during formation of the meltblown layer may create a web with increased void space within the meltblown web. For example, an open network of fibers may be formed which may have open voids that occupy a substantial portion of the layer. For instance, the void volume of the abrasive meltblown layer may be greater than about 10%, particularly greater than about 50%, and more particularly greater than about 60% of the volume of the material. These open void materials may inherently have good scrubbing properties.

In addition to adjusting the process conditions, or in combination with adjusting process conditions, an abrasive meltblown web may be prepared by selection of polymer resins based on the molecular weight of the polymer. In this way, the median and mean fiber size of the meltblown fibers can be increased so that a mixture of fibers having larger diameters may be produced. In addition, larger fiber diameters may result in an increase in conglomeration of fibers and/or production of shot within the meltblown layer. As noted previously, larger fibers may also result in an increase in open void volume within the meltblown layer.

Advantageously, it has also been observed that using polymers having lower melt flow rates for the production of the first meltblown layer 72 results in an exterior surface having a greater hardness in comparison to polymer resins having MFRs greater than 750 g/10 min.

In one embodiment, the meltblown fibers of first meltblown resin are formed from a polypropylene resin having an MFR ranging from about 400 to 650 g/10 min., and in particular, from about 400 to 600 g/10 min, and more particularly, from about 450 to 550 g/10 min. In a preferred embodiment, the first meltblown layer 72 comprises a polypropylene resin having an MFR from about 475 to 525 g/10 min.

In certain embodiments, the meltblown fibers comprising exterior surface 12 of the composite sheet material 70 exhibit a Shore Hardness A that is from about 48 to 60, and in particular, from about 49 to 55, and more particularly, from about 50 to 52.

In certain embodiments, the meltblown fibers of exterior surface 12 of the composite sheet material 70 exhibits a Shore Hardness A that is at least 48 or greater, at least 49 or greater, at least 50 or greater, at least 51 or greater, at least 52 or greater, at least 53 or greater, at least 54 or greater, at least 55 or greater, at least 56 or greater, at least 57 or greater, at least 58 or greater, at least 59 or greater, or at least 60 or greater.

Advantageously, the meltblown fibers of exterior surface 12 of the composite sheet material 70 exhibit a Shore Hardness A that is from about 5 to 20% greater than the Shore Hardness A of the meltblown fibers of exterior surface 78. In certain embodiments, the meltblown fibers of exterior surface 12 of the composite sheet material 70 exhibit a Shore Hardness A that is from about 8 to 16%, and in particular, 10 to 12% greater than the Shore Hardness A of the meltblown fibers of exterior surface 78.

The basis weight of the first meltblown layer 72 may range from about 4 to 48 g/m$^2$, and in particular, from about 8 to 30 g/m$^2$, and more typically, from about 10 to 20 g/m$^2$.

In certain embodiments, the exterior surface 12 of composite sheet material 70 in accordance with the embodiments of the disclosure exhibited a machine direction (MD) Arithmetic Average Roughness (Ra) ranging from about 200 to 500 μm, and in particular, from about 200 to 400 μm, and more particularly, from about 200 to 250 μm. In certain embodiments, the exterior surface 12 of the composite sheet material 70 exhibited a cross direction (CD) Arithmetic Average Roughness (Ra) ranging from about 250 to 500 μm, and in particular, from about 300 to 400 μm, and more particularly, from about 325 to 375 μm.

In certain embodiments, the exterior surface 12 of the composite sheet material 70 exhibited a machine direction (MD) Rz roughness (average maximum peak to valley height within a single sampling length) ranging from about 800 to 1,200 μm, and in particular, from about 850 to 1000 μm, and more particularly, from about 900 to 950 μm. In certain embodiments, the exterior surface 12 of the composite sheet material 70 exhibited a cross direction (CD) Rz roughness (average maximum peak to valley height within a single sampling length) ranging from about 1,100 to 1,400 μm, and in particular, from about 1,200 to 1,350 μm, and more particularly, from about 1,250 to 1,300 μm.

In certain embodiments, the composite sheet material 70 exhibits an increase in caliper following the projection forming process of about 25 to 160% in comparison to the identical material that has not been subjected to the projection forming process. In particular, the composite sheet material 70 may exhibits an increase in caliper of about 30 to 100%, and more particularly, from about 40 to 60% in comparison to the identical material that has not been subjected to the projection forming process.

In certain embodiments, the composite sheet material 70 exhibits an increase in surface area following the projection forming process of about 5 to 25% in comparison to the identical material that has not been subjected to the projection forming process. In particular, the composite sheet material 70 may exhibit an increase in surface area of about 6 to 20%, and more particularly, from about 10 to 18% in comparison to the identical material that has not been subjected to the projection forming process.

The second meltblown layer 74 comprises a fine meltblown layer comprising a plurality of fine meltblown fibers. As discussed previously, fine meltblown fibers generally have diameters ranging from about 0.5 to 10 μm, and in particular, from about 1 to 6 μm, and more particularly, from about 2 to 5 μm. Suitable polymers for preparing fine meltblown fibers are discussed previously. Suitable materials for preparing a fine meltblown fibers are discussed previously. An example of a suitable polypropylene resin is available from ExxonMobil, such as ACHEIVE™ pp 6936G2 (a metallocene catalyzed homopolymer polypropylene having an MFR of 1,550 g/10 min.); Total Petrochemicals and Refining USA, Inc. of La Port, TX, 77571 USA as grade 3962 (having an MFR of 1,300 g/10 min.); and LyondellBasell under the product name METOCENE™ MF650Y (a metallocene catalyzed polypropylene homopolymer having an MFR of 1,800 g/10 min.). The basis weight of the first meltblown layer 72 may range from about 4 to 48 g/m$^2$, and in particular, from about 8 to 30 g/m$^2$, and more typically, from about 10 to 20 g/m$^2$.

As discussed previously, functional layer 76 may provide additional functional properties, such as absorbency, strength, integrity, or the like to the composite sheet material 70.

Figure 4:
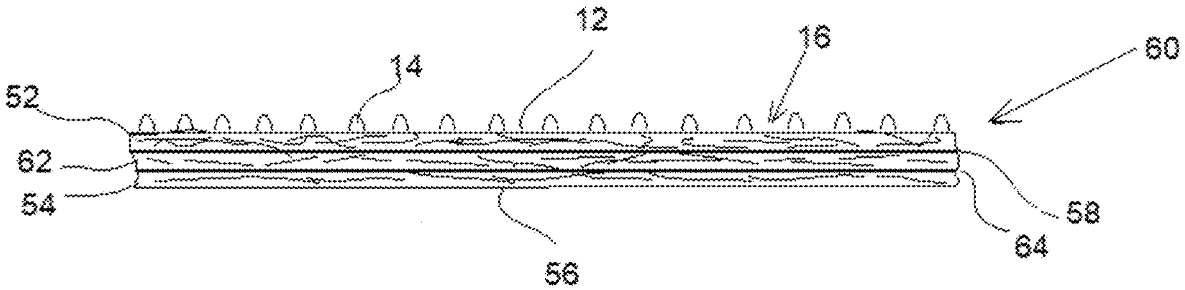
FIG. 4 is a cross-sectional side view of a composite sheet in accordance with at least one embodiment of the present invention.

Suitable materials and exemplary properties (e.g., thickness, basis weight, etc.) for the functional layer 76 are discussed previously in connection with the embodiment described in FIG. 4. In a preferred embodiment, the functional layer comprises an SMS composite fabric having the following structure spunbond/spunbond/meltblown/meltblown/spunbond, which is also referred to as an SSMMS composite fabric. In certain other embodiments, the functional layer 76 comprises one or more spunbond fabrics.

The thickness of composite sheet material 70 may range from about to 0.5 to 2.5 mm, and in particular, from about 0.8 to 2.0 mm, and more particularly, from about 1.2 to 1.5 mm. In a preferred embodiment, the composite sheet material 70 has a thickness that is about 1.3 to 1.4 mm.

The T composite sheet material 70 may also be bonded. As discussed above in connection with the composite sheet 60 of FIG. 4, composite sheet material 70 may be bonded to adjacent fibers using thermal, ultrasonic, mechanical, and adhesive bonding.

III. Representative Systems and Processes for Preparing Composite Sheets

Figure 3:
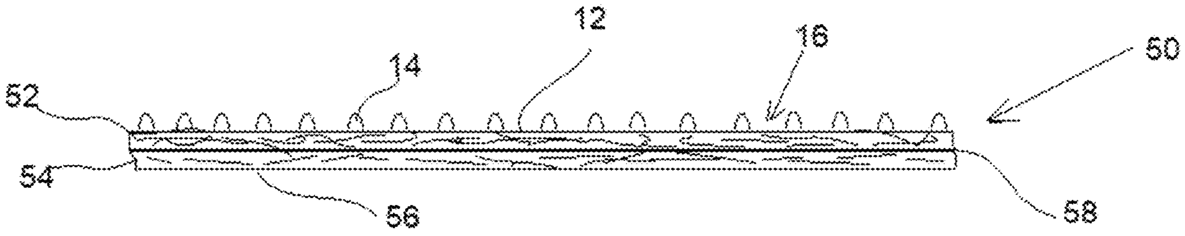
FIG. 3 is a cross-sectional side view composite sheet in accordance with at least one embodiment of the present invention.

A. System and Process for Preparing a Composite Sheet Comprising Two Fine Exterior Meltblown Layers With reference to FIG. 6, a system for preparing a composite sheet material comprising two fine meltblown layers (e.g., see FIG. 3, reference character 50) is broadly designated by reference character 100. The system includes a first meltblown beam **102*a* that is in communication with a polymer source 104*a* (e.g., an extruder and associated hopper). Polymer source 104*a* provides a stream of molten or semi-molten polymer to meltblown beam 102*a*. Meltblown beam 102*a* comprises a plurality of filament orifices configured to produce a first stream of meltblown fibers 108 from die tip 110**.

The first stream of meltblown fibers 108 is deposited onto collection surface 112 (e.g., an endless belt) to produce a meltblown nonwoven web 114. In some embodiments, the system 100 may include a vacuum source **116*a* disposed below the meltblown beam underlying the collection surface. The vacuum source 116*a*** assists in pulling the extruded meltblown fibers onto the collection surface.

A second meltblown beam **102*b* is positioned downstream of the first meltblown beam 102*a*. The second meltblown beam 102*b* is in communication with a second polymer source 104*b* (e.g., an extruder and associated hopper). Second polymer source 104*b* provides a stream of molten or semi-molten polymer to second meltblown beam 102*b*. Second meltblown beam 102*b* comprises a plurality of filament orifices configured to produce a second stream of meltblown fibers 110 from die tip 106*b***.

The second stream of meltblown fibers 110 is deposited onto the surface of meltblown nonwoven web 114 to form a second meltblown nonwoven web. In some embodiments, the system 100 may include a second vacuum source **116*b* disposed below the second meltblown beam and underlying the collection surface. The second vacuum source 116*b* assists in pulling the extruded meltblown fibers onto the surface of the meltblown nonwoven web 114 to produce a composite sheet material 118** comprising the two meltblown webs.

Figure 6:
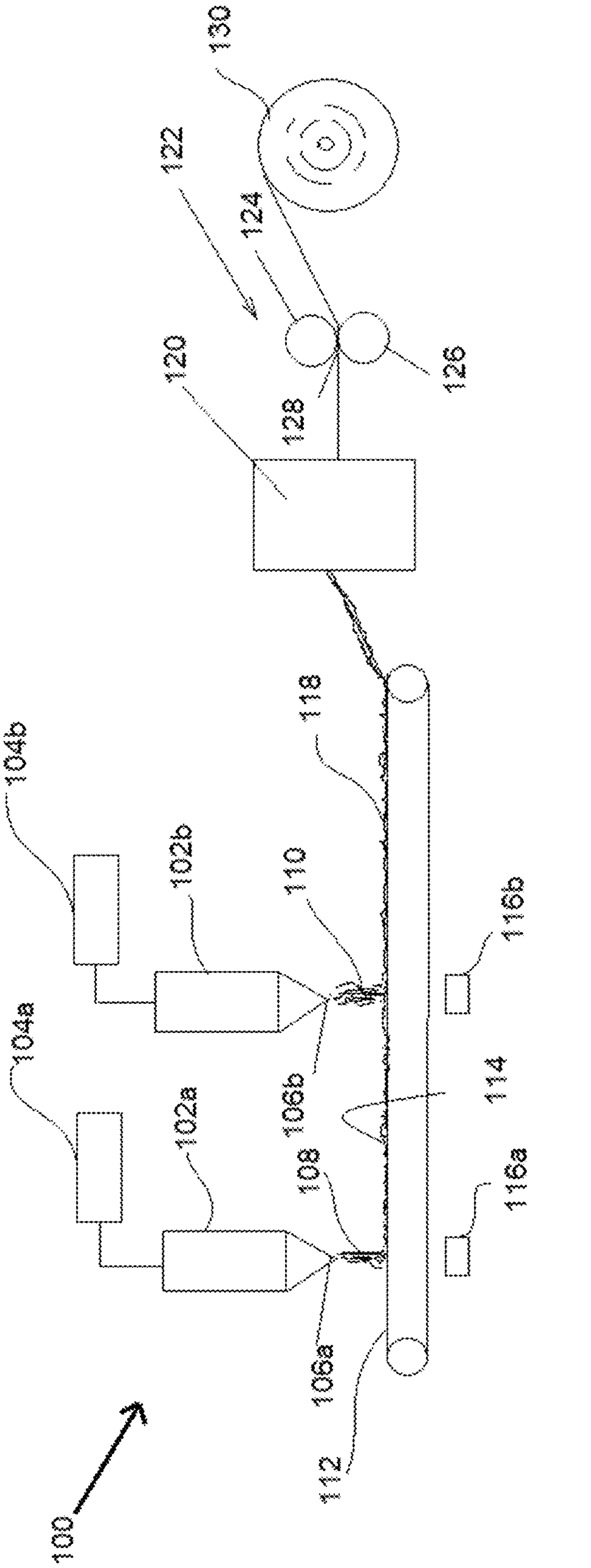
FIG. 6 is a schematic illustration of a system for preparing a composite sheet in accordance with an embodiment of the present invention.

Although FIG. 6 only shows a single polymer sources (e.g., one hopper/extruder) for providing one molten polymeric stream to the meltblown beam, it should be recognized that the system may include additional polymer sources (additional hoppers and extruders) for supplying additional molten polymeric streams to the meltblown beam. In one embodiment, the system may include three polymer sources for providing three molten polymeric streams to the meltblown beam.

The composite sheet material may then optionally be bonded by introducing the composite sheet material into bonding unit 120. Bonding unit 120 may comprise any device suitable for joining the two meltblown webs together. A wide variety of bonding methods may be used in accordance with the invention including thermal bonding (e.g., through air bonding or calender bonding), mechanical bonding (e.g., hydroentanglement or needle punching) and chemical bonding (e.g., use of an adhesive resin). For example, in some embodiments, the bonding unit may be configured to thermally bond the composite sheet materials. In one embodiment, the bonding unit may comprise a calender bonder comprising two heated rolls in which one of the rolls includes a plurality of bond points configured to bond the meltblown webs to each other at points of contact with the bond points. In other embodiments, the bonding unit 120 may comprise an air through bonder in which the composite sheet material is exposed to a stream of heated gas, such as air, that causes adjacent fibers to fuse together at points of contact.

In some embodiments, the system may include additional devices for further modifying or treating the composite sheet material. For example, the system may include a kiss roller or similar device for applying topical treatments, such as a surfactant, to a surface of the composite sheet material. In some embodiments, the system may also include one or more devices for incrementally stretching the composite sheet material. An example of such a device is a ring roller, which comprises a plurality of intermeshing rings that stretch select regions of the composite sheet material.

The composite sheet material is then subjected to a projection forming process by passing the composite sheet material through a roll assembly 122 comprising a pair of cylindrically shaped rolls 124, 126 at point 128. The cooperating rolls 122 comprises a first roll 126 having an exterior circumferential surface comprising a plurality of protuberances extending outwardly therefrom, and the second roll 124 includes a plurality of recesses formed in an exterior circumferential surface. The plurality of recesses are each configured to receive a corresponding protuberance therein.

In certain embodiments, the pair of cylindrically shaped rolls 124, 126 are positioned in a cooperating opposing relationship for receiving a sheet material therebetween. The rolls 126, 124 include a plurality of positive protuberances (see FIG. 2, reference character 14) that extend radially outwardly from a surface of at least one of the rolls, and a plurality of corresponding recesses that are disposed on the surface of the other roll. The recesses are positioned and arranged so as to receive corresponding protuberances disposed on the opposite roll. When rolls 124, 126 are rotated about their axes, each recess successively becomes aligned opposite a corresponding protuberance so that each protuberance at least partially penetrates into the corresponding recess. As a sheet material is directed between the rolls, protuberances that are in contact with the sheet material each engage a discrete portion of the sheet material. This engagement causes these discrete portions of the sheet material to be pushed into the recesses along with the protuberances. As a result, these isolated discrete portions of the sheet material are stretched and mechanically elongated. At the same time, areas of the sheet material that surround these stretched and elongated portions are gripped and held by the cooperating opposing surfaces of the rolls 124, 126, resulting in these areas remaining unstretched and unelongated.

As the sheet material 218 passes between rolls 124, 126, a plurality of discrete island-like projections (see, for example, reference character 14, FIGS. 1 and 2) of the sheet are formed in the sheet. The island-like projections 14 of the sheet material are isolated from adjacent stretched portions of the sheet material by areas of substantially unstretched sheet material, which define valleys disposed between adjacent projections.

In above discussion, the protuberances are described as being disposed on and projecting radially outwardly from the roll 126 and the recesses are described as being formed on the outer surface of roll 124. However, it should be recognized that the present invention is not limited to this specific position and configuration of the protuberances and recesses. For example, in some embodiments of the present invention, each roll may include both protuberances and recesses.

The size, shape, and distribution of the recesses may each be configured so that the recesses each have a continuous sidewall that defines an isolated free standing recess for receiving a single protuberance therein. The recesses may have sidewalls that substantially surround the protuberance and are unconnected to adjacent recesses. In some embodiments, this may result in the discrete stretched portions having a shape that resembles the cross-sectional shape of the recess and that are separated from adjacent stretched portions. For example, in embodiments where the recess has an oval cross-section, the portion of the sheet material entering the recess will be stretched in all directions (360 degrees about the circumference of the discrete portion) to form a projection on the surface of the sheet material having a generally oval shape.

As discussed previously, the protuberances may have a wide variety of shapes and configurations. For example, the protuberances may have circular, oval, square, rectangular, or polygonal cross-sections. The protuberances may also have a cross-section that varies along the length of the protuberance.

The size, density and distribution of the protuberances and corresponding recesses can be selected to control the amount of individual projections that may be present on the exterior surface of the sheet material. Preferably, the protuberances are present at a density of from about 15 to 95 percent of the total surface area of the roll. In some embodiments, the protuberances may be present at a density of from about 25 to 75 percent of the total surface area of the roll. In the context of the present invention, density refers to the surface area of the rolls that includes protuberances or recesses thereon.

In one embodiment, the density of the protuberances and recesses across the axial length of the rolls and/or radial circumference (e.g., machine direction) of the rolls may be varied to provide a sheet material having different zones of projections across the sheet material. As a result, a sheet material that is stretched according to this aspect of the invention may have different zones of projection density in both the machine direction and/or cross direction of the sheet material.

The roll assembly 122 may be driven in a wide variety of ways. For example, in one embodiment, the roll assembly may be product driven so that travel of the sheet material between the pair or rolls causes the rolls to rotate in the machine direction. In other embodiments, the rolls are mounted on central shafts that are rotatably driven by a suitable drive, such as a motor.

In certain embodiments, the height of the projections on the surface of the sheet material can be controlled by adjusting the depth to which the protuberances are permitted to penetrate into the recesses In certain embodiments, one or both rolls 124, 126 may be in mechanical communication with one or more devices that are configured to adjust the distance between the rolls. For instance, in some embodiments of the roll assembly, at least one of the rolls is in mechanical communication with a device for adjusting the distance between the rolls, such as a pair of powered cylinders configured to selectively adjust the distance between rolls 124 and 126. As a result, the distance between the rolls can be adjusted so that the amount of penetration of the protuberances into the recesses can be controlled. Controlling the distance to which the projections are permitted to penetrate the recesses can be used to control the height of the projections on the sheet material and also the void volume defined by the valleys disposed between adjacent projections. Devices for adjusting the distance between the rolls 124, 126 can be powered in a wide variety of ways including mechanically, pneumatically, electrically, and the like. The distance between the rolls 124, 126 can also be adjusted using other means such as motors, manual adjusting, fluid-pressured devices, and the like.

In certain embodiments, one or both of the rolls 124, 126 may be heated to assist in forming the projections on the surface of the sheet material. In some embodiments the rolls 124, 126 to, or above, the melting temperature of one or more of the polymers comprising the sheet material 118.

Once the composite sheet material has been subjected to the projection forming process, the composite sheet material may then be wound on roll 130.

As discussed above, the composite sheet material may be optionally bonded prior to the projection formation process. However, it should be recognized that in some embodiments the bonding unit may be disposed downstream of the roll assembly 122. In certain embodiments, the composite sheet material may not be subjected to any bonding process. In some embodiments, the projection forming process may provide sufficient thermal bonding of the individual components to each other (e.g., bonding of the first and second nonwoven webs) to form the composite sheet material without subjecting the sheet material to any additional bonding step (either prior or after the roll assembly 122).

In the system and process described with respect to FIG. 6, the system is shown as including two separate meltblown beams so that the composite sheet is prepared in a continuous process. However, in some embodiments, one or both of the meltblown nonwoven webs may be provided from a supply roll (not shown) which is then unwound and joined with the other meltblown nonwoven web prior to the projection forming process.

B. System and Process for Preparing a Composite Sheet Comprising Two Exterior Meltblown Layers and an Internal Functional Layer With reference to FIG. 7, a system for preparing a composite sheet material comprising two meltblown layers with at least one function layer sandwiched therebetween (e.g., see FIGS. 4 and 5, reference character 60, 70, respectively) is broadly designated by reference character 200. The system includes a first meltblown beam **202*a* that is in communication with a polymer source 204*a* (e.g., an extruder and associated hopper). Polymer source 204*a* provides a stream of molten or semi-molten polymer to meltblown beam 202*a*. Meltblown beam 202*a* comprises a plurality of filament orifices configured to produce a first stream of meltblown fibers 208*a* from die tip 206*a***.

The first stream of meltblown fibers **208*a* is deposited onto collection surface 112 (e.g., an endless belt) to produce a meltblown nonwoven web 212. In some embodiments, the system 200 may include a vacuum source 210*a* disposed below the meltblown beam underlying the collection surface. The vacuum source 210*a*** assists in pulling the extruded meltblown fibers onto the collection surface.

In embodiments in which one of the meltblown layers defines a scrubby exterior surface of the composite sheet material, the first stream of meltblown fibers comprises a polymer resin having a MFR selected to provide coarse fibers having a harder surface relative to the meltblown fibers comprising the fine meltblown layer. As discussed previously, the polymer resin for preparing the scrubby exterior surface may comprise a polypropylene resin having an MFR ranging from about 400 to 650 g/10 min., and in particular, from about 400 to 600 g/10 min, and more particularly, from about 450 to 550 g/10 min.

In addition, the meltblowing process conditions of meltblown beam **202*a* are selected to provide a more coarse surface by introducing one or more of roping of the meltblown fibers and the production of shot and fly. In some embodiments, this can be accomplished by adjusting the distance between the tip of the meltblown die 206*a* and the collection surface 112**, introducing more air turbulence, and running at lower air temperatures (e.g., around 340 to 360° F.), and combinations thereof.

In certain embodiments, a supply roll 216 is configured and arranged to provide a nonwoven fabric 218 to be deposited onto the surface of the first meltblown nonwoven web 212 to form a composite 220 comprising the functional layer of the composite sheet material. As discussed previously, the functional layer may comprise a variety of different nonwoven fabrics. In a preferred embodiment, the functional layer comprises a laminate having an SMS or SSMMS structure or a spunbond nonwoven fabric. Although nonwoven fabric 218 is depicted as being supplied via supply roll 216, it should be recognized that the functional layer may be formed in situ using one or more meltblown or spunbond beams, carding devices, airlaid devices, or the like.

It should be recognized that the nonwoven fabric layer may deposited onto the surface of the first meltblown nonwoven web 212 using other methods not shown. For example, the first meltblown web 212 may be deposited onto a first collection surface. Next, the first meltblown web 212 may be driven off of the collection surface and then combined with the nonwoven fabric layer 218 to form composite sheet 220. Thereafter, the composite sheet 220 is supplied onto a second collection surface at which point the second meltblown web is deposited overlying the nonwoven layer 218 to form composite sheet material 222. In other embodiments, the first meltblown web 212 may be formed on a first collection surface, the second meltblown web separately formed on a second collection surface, and then the two separately formed meltblown webs may be combined with a functional layer downstream of the first and second meltblown beams. The thus formed composite may then be bonded or subjected to the projection forming process.

A second meltblown beam **202*b* is positioned downstream of the first meltblown beam 202*a* and supply roll 216. The second meltblown beam 202*b* is in communication with a second polymer source 204*b* (e.g., an extruder and associated hopper). Second polymer source 204*b* provides a stream of molten or semi-molten polymer to second meltblown beam 202***b*. Second meltblown beam 202*b* comprises a plurality of filament orifices configured to produce a second stream of meltblown fibers 208*b* from die tip 206*b*.

The second stream of meltblown fibers 208*b* is deposited onto the surface of the functional layer to form a second meltblown nonwoven web. In some embodiments, the system 200 may include a second vacuum source 210*b* disposed below the second meltblown beam and underlying the collection surface. The second vacuum source 210*b* assists in pulling the extruded meltblown fibers onto the surface of the functional layer to produce a composite sheet material 222 comprising the two meltblown webs with the functional layer sandwiched therebetween.

Figure 7:
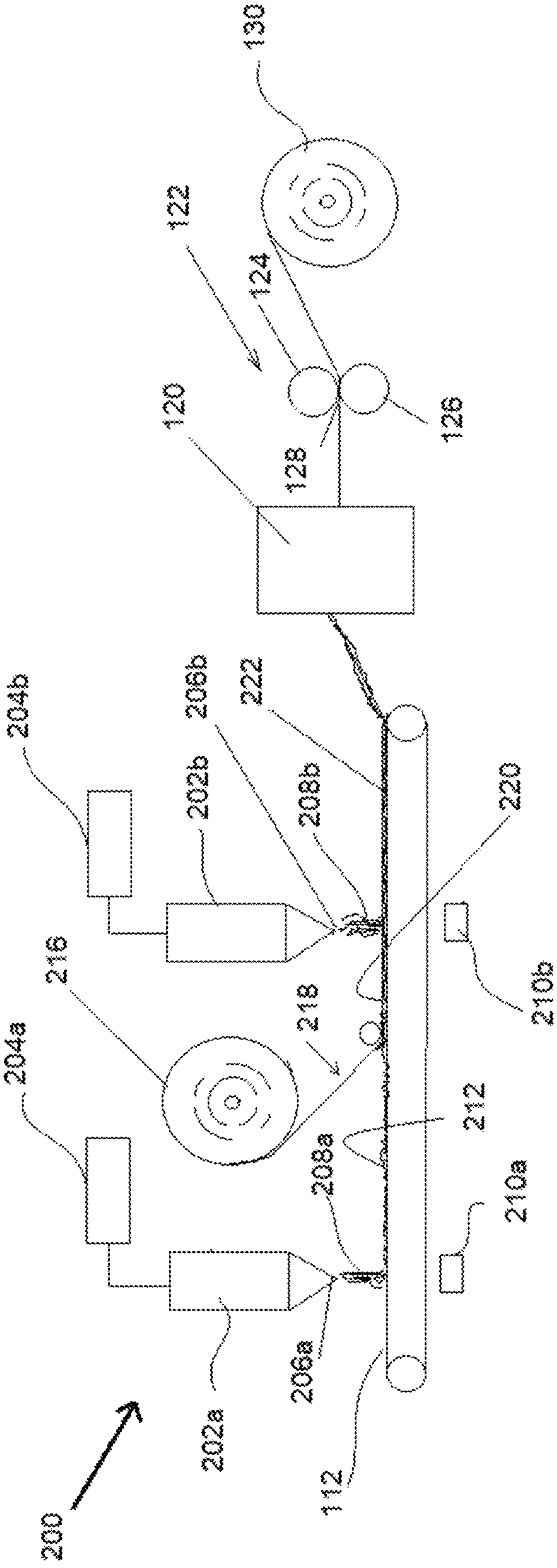
FIG. 7 is a schematic illustration of a system for preparing a composite sheet in accordance with an embodiment of the present invention.

Although FIG. 7 only shows a single polymer sources (e.g., one hopper/extruder) for providing one molten polymeric stream to the meltblown beam, it should be recognized that the system may include additional polymer sources (additional hoppers and extruders) for supplying additional molten polymeric streams to the meltblown beam. In one embodiment, the system may include three polymer sources for providing three molten polymeric streams to the meltblown beam.

The composite sheet material may then optionally be bonded by introducing the composite sheet material 222 into bonding unit 120. As discussed previously, bonding unit 120 may comprise any device suitable for joining the layers of the composite sheet material 222. For example, in some embodiments, the bonding unit may be configured to thermally bond the composite sheet materials. In one embodiment, the bonding unit may comprise a calender bonder comprising two heated rolls in which one of the rolls includes a plurality of bond points configured to bond the meltblown webs to each other at points of contact with the bond points. In other embodiments, the bonding unit 120 may comprise an air through bonder in which the composite sheet material is exposed to a stream of heated gas, such as air, that causes adjacent fibers to fuse together at points of contact.

In some embodiments, the system may include additional devices for further modifying or treating the composite sheet material. For example, the system may include a kiss roller or similar device for applying topical treatments, such as a surfactant, to a surface of the composite sheet material. In some embodiments, the system may also include one or more devices for incrementally stretching the composite sheet material. An example of such a device is a ring roller, which comprises a plurality of intermeshing rings that stretch select regions of the composite sheet material.

The composite sheet material is then subjected to a projection forming process by passing the composite sheet material through a roll assembly 122 comprising a pair of cylindrically shaped rolls 124, 126 at point 128. The roll assembly 122 and the projection forming process are discussed in greater detail above. After the composite sheet material 222 has been subjected to the projection forming process, the composite sheet material may then be wound on roll 130.

As discussed above, the composite sheet material may be optionally bonded prior to the projection formation process. However, it should be recognized that in some embodiments the bonding unit may be disposed downstream of the roll assembly 122. In certain embodiments, the composite sheet material may not be subjected to any bonding process. In some embodiments, the projection forming process may provide sufficient thermal bonding of the individual components to each other (e.g., bonding of the first and second nonwoven webs) to form the composite sheet material without subjecting the sheet material to any additional bonding step (either prior or after the roll assembly 122).

In the system and process described with respect to FIG. 7, the system is shown as including two separate meltblown beams so that the composite sheet is prepared in a continuous process. However, in some embodiments, one or both of the meltblown nonwoven webs may be provided from a supply roll (not shown) which is then unwound and joined with the other meltblown nonwoven web and functional layer prior to the projection forming process.

IV. Bio-Based Composite Sheets

In a further aspect, embodiments of the invention are directed to composite sheet materials predominately composed of bio-based materials, and in particular, to bio-based polymers. In contrast to polymers derived from petroleum sources, bio-based polymers are generally derived from a bio-based material and are considered to be sustainable. In some embodiments, a bio-based polymer may also be considered biodegradeable. A special class of biodegradable product made with a bio-based material might be considered as compostable if it can be degraded in a composing environment. The European standard EN 13432, “Proof of Compostability of Plastic Products” may be used to determine if a fabric or film comprised of sustainable content could be classified as compostable.

In one such embodiment, composite sheet materials comprise fibers comprising a bio-based polymer. In certain embodiments, the fibers of the composite sheet (e.g., the outer meltblown layers and internal functional layer) are substantially free of synthetic materials, such as petroleum-based materials and polymers. For example, fibers comprising the composite sheet materials in accordance with various embodiments of the invention may have less than 25 weight percent of materials that are non-bio-based, and more preferably, less than 20 weight percent, less than 15 weight percent, less than 10 weight percent, and even more preferably, less than 5 weight percent of non-bio-based materials, based on the total weight of the inventive composite sheet material.

In one embodiment, bio-based polymers for use may include aliphatic polyester based polymers, such as polylactic acid (PLA) and polybutylene succinate (PBS), and bio-based derived polyethylene.

Aliphatic polyesters useful in the present invention may include homo- and copolymers of poly(hydroxyalkanoates), and homo- and copolymers of those aliphatic polyesters derived from the reaction product of one or more polyols with one or more polycarboxylic acids that are typically formed from the reaction product of one or more alkanediols with one or more alkanedicarboxylic acids (or acyl derivatives). Polyesters may further be derived from multifunctional polyols, e.g. glycerin, sorbitol, pentaerythritol, and combinations thereof, to form branched, star, and graft homo- and copolymers. Polyhydroxyalkanoates generally are formed from hydroxyacid monomeric units or derivatives thereof. These include, for example, polylactic acid, polyhydroxybutyrate, polyhydroxyvalerate, polycaprolactone and the like. Miscible and immiscible blends of aliphatic polyesters with one or more additional semicrystalline or amorphous polymers may also be used.

One useful class of aliphatic polyesters are poly(hydroxyalkanoates), derived by condensation or ring-opening polymerization of hydroxy acids, or derivatives thereof. Suitable poly(hydroxyalkanoates) may be represented by the formula: $H(O—R—C(O)—)_nOH$ where R is an alkylene moiety that may be linear or branched having 1 to 20 carbon atoms, preferably 1 to 12 carbon atoms optionally substituted by catenary (bonded to carbon atoms in a carbon chain) oxygen atoms; n is a number such that the ester is polymeric, and is preferably a number such that the molecular weight of the aliphatic polyester is at least 10,000, preferably at least 30,000, and most preferably at least 50,000 daltons. In certain embodiments, the molecular weight of the aliphatic polyester is typically less than 1,000,000, preferably less than 500,000, and most preferably less than 300,000 daltons. R may further comprise one or more catenary (i.e. in chain) ether oxygen atoms. Generally, the R group of the hydroxy acid is such that the pendant hydroxyl group is a primary or secondary hydroxyl group.

Useful poly(hydroxyalkanoates) include, for example, homo- and copolymers of poly(3-hydroxybutyrate), poly(4-hydroxybutyrate), poly(3-hydroxyvalerate), poly(lactic acid) (as known as polylactide), poly(3-hydroxypropanoate), poly(4-hydropentanoate), poly(3-hydroxypentanoate), poly(3-hydroxyhexanoate), poly(3-hydroxyheptanoate), poly(3-hydroxyoctanoate), polydioxanone, polycaprolactone, and polyglycolic acid (i.e. polyglycolide). Copolymers of two or more of the above hydroxy acids may also be used, for example, poly(3-hydroxybutyrate-co-3-hydroxyvalerate), poly(lactate-co-3-hydroxypropanoate), poly(glycolide-co-p-dioxanone), and poly(lactic acid-co-glycolic acid). Blends of two or more of the poly(hydroxyalkanoates) may also be used, as well as blends with one or more semicrystalline or amorphous polymers and/or copolymers.

The aliphatic polyester may be a block copolymer of poly(lactic acid-co-glycolic acid). Aliphatic polyesters useful in the inventive composite sheet materials may include homopolymers, random copolymers, block copolymers, star-branched random copolymers, star-branched block copolymers, dendritic copolymers, hyperbranched copolymers, graft copolymers, and combinations thereof.

Another useful class of aliphatic polyesters includes those aliphatic polyesters derived from the reaction product of one or more alkanediols with one or more alkanedicarboxylic acids (or acyl derivatives). Such polyesters have the general formula:

$$HO(\overset{O}{\overset{\|}{C}}R''\overset{O}{\overset{\|}{C}})_n\text{—}[OR'O\text{—}\overset{O}{\overset{\|}{C}}\text{—}R''\text{—}\overset{O}{\overset{\|}{C}}\text{—}O]_m\bullet(R'O)_nH,$$

where R' and R" each represent an alkylene moiety that may be linear or branched having from 1 to 20 carbon atoms, preferably 1 to 12 carbon atoms, and m is a number such that the ester is polymeric, and is preferably a number such that the molecular weight of the aliphatic polyester is at least 10,000, preferably at least 30,000, and most preferably at least 50,000 daltons, but less than 1,000,000, preferably less than 500,000 and most preferably less than 300,000 daltons. Each n is independently 0 or 1. R' and R" may further comprise one or more catenary (i.e. in chain) ether oxygen atoms.

Examples of aliphatic polyesters include those homo- and copolymers derived from (a) one or more of the following diacids (or derivative thereof): succinic acid; adipic acid; 1,12 dicarboxydodecane; fumaric acid; glutaric acid; diglycolic acid; and maleic acid; and (b) one of more of the following diols: ethylene glycol; polyethylene glycol; 1,2-propane diol; 1,3-propanediol; 1,2-propanediol; 1,2-butanediol; 1,3-butanediol; 1,4-butanediol; 2,3-butanediol; 1,6-hexanediol; 1,2 alkane diols having 5 to 12 carbon atoms; diethylene glycol; polyethylene glycols having a molecular weight of 300 to 10,000 daltons, and preferably 400 to 8,000 daltons; propylene glycols having a molecular weight of 300 to 4000 daltons; block or random copolymers derived from ethylene oxide, propylene oxide, or butylene oxide; dipropylene glycol; and polypropylene glycol, and (c) optionally a small amount, i.e., 0.5-7.0 mole percent of a polyol with a functionality greater than two, such as glycerol, neopentyl glycol, and pentaerythritol.

Such polymers may include polybutylene succinate homopolymer, polybutylene adipate homopolymer, polybutyleneadipate-succinate copolymer, polyethylenesuccinate-adipate copolymer, polyethylene glycol succinate homopolymer and polyethylene adipate homopolymer.

Commercially available aliphatic polyesters include poly (lactide), poly(glycolide), poly(lactide-co-glycolide), poly (L-lactide-co-trimethylene carbonate), poly(dioxanone), poly(butylene succinate), and poly(butylene adipate).

The term "aliphatic polyester" covers—besides polyesters which are made from aliphatic and/or cycloaliphatic components exclusively also polyesters which contain besides aliphatic and/or cycloaliphatic units, aromatic units, as long as the polyester has substantial sustainable content.

In addition to PLA based resins, composite sheet materials in accordance with embodiments of the invention may include other polymers derived from an aliphatic component possessing one carboxylic acid group and one hydroxyl group, which are alternatively called polyhydroxyalkanoates (PHA). Examples thereof are polyhydroxybutyrate (PHB), poly-(hydroxybutyrate-co-hydroxyvalerate) (PHBV), poly-(hydroxybutyrate-co-polyhydroxyhexanoate) (PHBH), polyglycolic acid (PGA), poly-(epsilon-caprolactone) (PCL) and preferably polylactic acid (PLA).

Examples of additional polymers that may be used in embodiments of the invention include polymers derived from a combination of an aliphatic component possessing two carboxylic acid groups with an aliphatic component possessing two hydroxyl groups, and are polyesters derived from aliphatic diols and from aliphatic dicarboxylic acids, such as polybutylene succinate (PBSU), polyethylene succinate (PESU), polybutylene adipate (PBA), polyethylene adipate (PEA), polytetramethylene adipate/terephthalate (PTMAT).

Useful aliphatic polyesters include those derived from semicrystalline polylactic acid. Poly(lactic acid) or polylactide (PLA) has lactic acid as its principle degradation product, which is commonly found in nature, is non-toxic and is widely used in the food, pharmaceutical and medical industries. The polymer may be prepared by ring-opening polymerization of the lactic acid dimer, lactide. Lactic acid is optically active and the dimer appears in four different forms: L,L-lactide, D,D-lactide, D,L-lactide (meso lactide) and a racemic mixture of L,L- and D,D-. By polymerizing these lactides as pure compounds or as blends, poly(lactide) polymers may be obtained having different stereochemistries and different physical properties, including crystallinity. The L,L- or D,D-lactide yields semicrystalline poly (lactide), while the poly(lactide) derived from the D,L-lactide is amorphous.

Generally, polylactic acid based polymers are prepared from dextrose, a source of sugar, derived from field corn. In North America corn is used since it is the most economical source of plant starch for ultimate conversion to sugar. However, it should be recognized that dextrose can be derived from sources other than corn. Sugar is converted to lactic acid or a lactic acid derivative via fermentation through the use of microorganisms. Lactic acid may then be polymerized to form PLA. In addition to corn, other agriculturally-based sugar sources may be used including rice, sugar beets, sugar cane, wheat, cellulosic materials, such as xylose recovered from wood pulping, and the like.

The polylactide preferably has a high enantiomeric ratio to maximize the intrinsic crystallinity of the polymer. The degree of crystallinity of a poly(lactic acid) is based on the regularity of the polymer backbone and the ability to crystallize with other polymer chains. If relatively small amounts of one enantiomer (such as D-) is copolymerized with the opposite enantiomer (such as L-) the polymer chain becomes irregularly shaped, and becomes less crystalline. For these reasons, when crystallinity is favored, it is desirable to have a poly(lactic acid) that is at least 85% of one isomer, at least 90% of one isomer, or at least 95% of one isomer in order to maximize the crystallinity.

In some embodiments, an approximately equimolar blend of D-polylactide and L-polylactide is also useful. This blend forms a unique crystal structure having a higher melting point (about 210° C.) than does either the D-poly(lactide) and L-(polylactide) alone (about. 190° C.), and has improved thermal stability.

Copolymers, including block and random copolymers, of poly(lactic acid) with other aliphatic polyesters may also be used. Useful co-monomers include glycolide, beta-propiolactone, tetramethylglycolide, beta-butyrolactone, gamma-butyrolactone, pivalolactone, 2-hydroxybutyric acid, alpha-hydroxyisobutyric acid, alpha-hydroxyvaleric acid, alpha-hydroxyisovaleric acid, alpha-hydroxycaproic acid, alpha-hydroxyethylbutyric acid, alpha-hydroxyisocaproic acid, alpha-hydroxy-beta-methylvaleric acid, alpha-hydroxyoctanoic acid, alpha-hydroxydecanoic acid, alpha-hydroxymyristic acid, and alpha-hydroxystearic acid.

Blends of poly(lactic acid) and one or more other aliphatic polyesters, or one or more other polymers may also be used. Examples of useful blends include poly(lactic acid) and poly(vinyl alcohol), polyethylene glycol/polysuccinate, polyethylene oxide, polycaprolactone and polyglycolide.

In certain preferred embodiments, the aliphatic polyester component comprises a PLA based resin. A wide variety of different PLA resins may be used to prepare composite sheet materials in accordance with embodiments of the invention.

In embodiments in which the functional layer comprises a spunbond nonwoven layer, the PLA resin should have proper molecular properties to be spun in spunbond processes. Examples of suitable include PLA resins are supplied from NatureWorks LLC, of Minnetonka, Minn. 55345 such as, grade 6752D, 6100D, and 6202D, which are believed to be produced as generally following the teaching of U.S. Pat. Nos. 5,525,706 and 6,807,973 both to Gruber et al. Other examples of suitable PLA resins may include L130, L175, and LX175, all from Corbion of Arkelsedijk 46, 4206 A C Gorinchem, the Netherlands.

In certain embodiments, the meltblown layers of the composite sheet material may comprise a bio-based PLA polymer. An example of one such bio-based polymer that can be used to prepare meltblown fibers is available from NatureWorks under the product name INGEO™ Biopolymer 6252D (having an MFR of 70-85 g/10 min, and a typical fiber denier of 1-2 dbf).

In certain embodiments, the fibers of one or more of the meltblown layers and functional layer may have a sheath/core configuration in which the sheath and the core both comprise a PLA resin. In these embodiments, a composite sheet material may be provided that is substantially free of synthetic polymer components, such as petroleum-based materials and polymers. For example, meltblown fibers of the composite sheet material may have a bicomponent arrangement in which the both components are PLA based to thus produce a meltblown fiber that is 100% PLA. As used herein, "100% PLA" may also include up to 5% additives including additives and/or masterbatches of additives to provide, by way of example only, color, softness, slip, antistatic protection, lubricity, hydrophilicity, liquid repellency, antioxidant protection, antimicrobial, and the like. In this regard, the fibers comprising the composite sheet material may comprise 95-100% PLA, such as from 96-100% PLA, 97-100% PLA, 98-100% PLA, 99-100% PLA, etc. When such additives are added as a masterbatch, for instance, the masterbatch carrier may primarily comprise PLA in order to facilitate processing and to maximize sustainable content within the fibers. For example, the meltblown fibers of the composite sheet material may comprise one or more additional additives. In such embodiments, for instance, the additive may comprise at least one of a colorant, a softening agent, a slip agent, an antistatic agent, a lubricant, a hydrophilic agent, a liquid repellent, an antioxidant, antimicrobial agent, and the like, or any combination thereof.

In one embodiment, the PLA polymer of the sheath may be the same PLA polymer as that of the core. In other embodiments, the PLA polymer of the sheath may be a different PLA polymer than that of the core. For example, the bicomponent staple fibers may comprise PLA/PLA bicomponent fibers such that the sheath comprises a first PLA grade, the core comprises a second PLA grade, and the first PLA grade and the second PLA grade are different (e.g., the first PLA grade has a lower melting point than the second PLA grade). By way of example only, the first PLA grade may comprise up to about 5% crystallinity, and the second PLA grade may comprise from about 40% to about 50% crystallinity.

In some embodiments, for instance, the first PLA grade may comprise a melting point from about 125° C. to about 135° C., and the second PLA grade may comprise a melting point from about 155° C. to about 170° C. In further embodiments, for example, the first PLA grade may comprise a weight percent of D isomer from about 4 wt. % to about 10 wt. %, and the second PLA grade may comprise a weight percent of D isomer of about 2 wt. %.

For example, in one embodiment, the core may comprise a PLA having a lower % D isomer of polylactic acid than that of the % D isomer PLA polymer used in the sheath. The PLA polymer with lower % D isomer will show higher degree of stress induced crystallization during spinning while the PLA polymer with higher D % isomer will retain a more amorphous state during spinning. The more amorphous sheath will promote bonding while the core showing a higher degree of crystallization will provide strength to the fiber and thus to the final bonded web. In one particular embodiment, the Nature Works PLA Grade PLA 6752 with 4% D Isomer can be used as the sheath while NatureWorks Grade 6202 with 2% D Isomer can be used as the core.

In some embodiments, the inventive composite sheet material may comprise a bio-based polymer comprising biodegradable products that are derived from an aliphatic component possessing one carboxylic acid group (or a polyester forming derivative thereof, such as an ester group) and one hydroxyl group (or a polyester forming derivative thereof, such as an ether group) or may be derived from a combination of an aliphatic component possessing two carboxylic acid groups (or a polyester forming derivative thereof, such as an ester group) with an aliphatic component possessing two hydroxyl groups (or a polyester forming derivative thereof, such as an ether group).

Additional nonlimiting examples of bio-based polymers include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

In some embodiments, the composite sheet material may comprise a bio-based polymer comprising a bio-based polyethylene or bio-based polypropylene that is derived from a biological source. For example, bio-based polyethylene can be prepared from sugars that are fermented to produce ethanol, which in turn is dehydrated to provide ethylene. An example of a suitable sugar cane derived polyethylene is available from Braskem S. A. under the product name PE SHA7260.

In some embodiments of the bio-based meltblown fibers, the sheath may comprise a bio-based polyethylene, and the core may comprise a PLA polymer.

In some embodiments, the sheath may comprise a PLA or PBS polymer and the core a synthetic polymer, such as polypropylene.

V. Additional Optional Components of the Composite Sheet Material

In some embodiments, the meltblown fibers and fibers of the functional layer of the composite sheet material may include one or more additives that are blended with the polymer(s) during the melt extrusion phase. Examples of suitable additives include one or more of molecular and/or gas filters, such as zeolites, ion-exchange particles, activated carbon, and the like, colorants, such as pigments (e.g., $TiO_2$), UV stabilizers, hydrophobic agents, hydrophilic agents, antistatic agent, elastomers, compatibilizers antioxidants, anti-block agent, slip agent, optical brighteners, flame retardants, polymer rheology modifier, antimicrobials, such as copper oxide and zinc oxide and the like.

In certain embodiments, the meltblown fibers or the composite sheet material may include antimicrobial additives. Suitable antimicrobial agents may include silver ion-based agents comprising compounds that contain silver as part of the structure that can be covalently bound, ionically bound or bound by other mechanisms known as "charge-transfer" complexes. Such compounds may include clathrate compounds that involve silver or silver species as part of the structure. Silver ion-based agents also include silver or silver-containing species that exist as a result of the process of sorption, either chemical or physical. To enable absorption of adsorption, the sorptive surface can be a molecule, polymer, organic or inorganic entity.

Additional antimicrobial agents include compounds containing zinc, copper, titanium, magnesium, quaternary ammonium, silane (alkyltrialkoxysilanes), cadmium, mercury, biguanides, amines, glucoprotamines, chitosan, trichlocarbon and triclosan.

Composite sheet materials comprising antimicrobial agents may be particularly useful as disinfectant wipes for treating surfaces, sporting goods equipment, medical equipment and devices personal hygiene products, wound care applications, and the like.

In certain embodiments, the functional layer may comprise cellulose staple fibers that are blended with staple fibers or meltblown fibers.

Examples of wood pulp fibers include pulps prepared from a variety of pulping processes, such a kraft pulp, sulfite pulp, thermo-mechanical pulp, etc. Conventional wood pulp fibers include treated and untreated pulps. Examples of conventional wood pulp fibers may include softwood fibers having an average fiber length of greater than 1 millimeter (mm) and particularly from about 2 mm to 5 mm. Such softwood fibers can include, but are not limited to: northern softwood, southern softwood, redwood, red cedar, hemlock, pine (e.g. southern pines), spruce (e.g. black spruce), combinations thereof, and so forth. Exemplary commercially available conventional wood pulp fibers suitable in the present invention include those available from Georgia Pacific under the designation 4722. Hardwood fibers, such as *eucalyptus*, maple, birch, aspen, and so forth, can also be used as conventional pulp fibers. In certain instances, secondary fibers obtained from recycled materials may be used, such as fiber pulp from sources such as, for example, newsprint, reclaimed paperboard and office waste.

Bamboo derived staple fibers may comprise treated and untreated bamboo pulp. Typical pulping methods for obtaining bamboo derived staple fibers may include chemical pulping, chemi-mechanical pulp, thermal mechanical pulp, and mixtures thereof.

A wide variety of different bamboo species may be used. Both running bamboo and clumping bamboo may be utilized. In certain embodiments, the bamboo derived staple fibers may be derived from clumping bamboo.

Typically, bamboo derived staple fibers for use in certain embodiments of the invention exhibit average lengths ranging from 0.5 to 3 mm, and in particular, from about 0.7 to 2.5 mm, such as from about 0.8 to 2.2 mm, and more particularly, from about 1.2 to 2.0 mm. In a preferred embodiment, the bamboo derived staple fibers exhibit lengths ranging from 1.6 to 1.8 mm.

In certain embodiments, the bamboo derived staple fibers exhibit widths (cross-section diameters) ranging from 10 to 26 microns, and in particular, from about 12 to 22 microns, and more particularly, from about 14 to 20 microns. In a preferred embodiment, the bamboo derived staple fibers exhibit widths ranging from 1.6 to 18 microns.

In some embodiments, the bamboo derived staple fibers exhibit a length to width ratio that is from about 120 to 60, and in particular, from about 110 to 70, and more particularly, from about 80 to 100. In a preferred embodiment, the bamboo derived staple fibers exhibit a length to width ratio that is from about 92 to 98.

In certain embodiments, the amount of bamboo derived staple fibers that may be present in the functional layer may range from about 20 to 95 weight %, and in particular, from about 30 to 75 weight percent, based on the total weight of the functional layer. In a preferred embodiment, the amount of bamboo derived staple fibers in the functional layer is from about 40 to 60 weight %, based on the total weight of the functional layer.

In certain embodiments, the functional layer may include non-cellulose staple fibers that may be in the form of a carded fabric, airlaid fabric, or conform fabric.

The non-cellulose staple fibers for use in an airlaid nonwoven typically have lengths ranging from about 0.8 to 15 mm, and in particular, from about 3 to 10 mm, and more particularly, from about 3 to 6 mm.

The non-cellulose staple fibers for use in a carded nonwoven typically have lengths ranging from about 20 to 60 mm, and in particular, from about 25 to 55 mm, and more particularly, from about 35 to 52 mm.

Suitable materials for the non-cellulose staple fibers for use in the functional layer may comprise monocomponent or multicomponent fibers, or mixtures of monocomponent and multicomponent fibers. In a preferred embodiment, the non-cellulose staple fibers of the functional layer comprise bicomponent fibers having a sheath/core configuration.

In one embodiment, the staple fibers comprise bicomponent fibers have a sheath/core configuration. Examples of bicomponent fibers include side-by-side, islands in the sea, and sheath/core arrangements. Preferably, the fibers have a sheath/core structure in which the sheath comprises a first polymer component, and the core comprises a second polymer component. In this arrangement, the polymers of the first and second polymer components may be the same or different from each other. For example, in one embodiment, the sheath comprises a first polymer component, and the core comprises a second polymer component that is different or the same as the first polymer component. In a preferred embodiment, the first and second polymer components of the bicomponent fibers are different from each other.

In some embodiments, the staple fibers of the functional layer may have a sheath/core configuration in which the core is centered relative to the sheath. Alternatively, the core may be present in an off-set configuration relative to the sheath. In this configuration, the core not centrally aligned relative to the sheath. As a result, when heat is applied, such as during bonding, the fibers will have a tendency to curl or crimp, which in turn may help provide loft to the functional layer.

In one embodiment, the first polymer component of the sheath comprises a polymer having a lower melting temperature than that of the second polymer component comprising the core. The lower melting polymer of the sheath will promote bonding while the polymer component of the core having a higher melting temperature will provide strength to the fiber and thus to the final bonded nonwoven.

Generally, the weight percentage of the sheath to that of the core in the fibers may vary widely depending upon the desired properties of the nonwoven fabric. For example, the weight ratio of the sheath to the core may vary between about 10:90 to 90:10, and in particular from about 20:80 to 80:20. In a preferred embodiment, the weight ratio of the sheath to the core is about 60:40 to 40:60, with a weight ratio of about 50:50 being preferred.

A wide variety of polymers may be used for preparing non-cellulose staple fibers for use in the functional layer. Examples of suitable fibers include may include polyolefins, such as polypropylene and polyethylene, and copolymers thereof, polyesters, such as polyethylene terephthalate (PET), polytrimethylene terephthalate (PTT), and polybutylene terephthalate (PBT), nylons, polystyrenes, copolymers, and blends thereof, and other synthetic polymers that may be used in the preparation of fibers. In one embodiment, the non-cellulose staple fibers have a sheath/core configuration comprising a polyethylene sheath and a polypropylene core. In other embodiments, the staple fibers may have a sheath/core configuration comprising a polyethylene sheath and a polyester core, such as a core comprising polyethylene terephthalate.

In some embodiments, the non-cellulose staple fibers may comprise a blend of fibers such as a blend of bicomponent staple fibers having a polyethylene sheath and a polyethylene terephthalate core, and bicomponent staple fibers having a polyethylene sheath and a polypropylene core. In one embodiment, the fibers of the functional layer may include eccentric bicomponent staple fibers having a polyethylene sheath and a polyethylene terephthalate core, a fineness of 4.3 dtex, and an average length of 3 to 6 mm.

In one embodiment, the non-cellulose staple fibers of the functional layer may comprise bicomponent staple fibers having a polyethylene sheath and a polyethylene terephthalate core. One such example is bicomponent staple fiber having a fineness of 2.2 dtex, and an average length of 3 mm, which are available from Toray Chemical Korea Inc. under the product name EZBON A (UN-204). A further example is an eccentric bicomponent staple fibers having a polyethylene sheath and a polyethylene terephthalate core. Such a fiber is available from IndoramaPolyester Industries Public Company Limited under the product name TS47 (a fineness of 4.3 dtex, and an average length of 3 mm). Another example is a bicomponent staple fibers having a polyethylene sheath and a polyethylene terephthalate core is available from Trevira under the product designation T255 staple fibers. These staple fibers have a fineness of 4.3 dtex, and an average length of 3 mm.

In another embodiment, the non-cellulose staple fibers may comprise bicomponent staple fibers having a polyethylene sheath and a polypropylene core. One such example is a staple fiber having a fineness of 4.0 dtex, and an average length of 4 mm, which are available from Yangzhou Petrochemical Co. Ltd. under the product name Y116. Another example of bicomponent staple fibers having a polyethylene sheath and a polypropylene core, a denier of 6.0, and an average length of 5 mm, are available from JiangNan High Polymer Fiber under the product designation JNGX-PZ11-6*51L.

In some embodiments, the non-cellulose fibers may comprise blends of fibers, such as blends comprising bicomponent PE/PET and PE/PP staple fibers.

The above noted polymers are generally considered to be derived from synthetic sources, such as a petroleum derived polymer. In some embodiments, it may be desirable to provide a functional layer comprising non-cellulose staple fibers derived from a bio-based polymer. Examples of suitable bio-based polymers are discussed previously.

EXAMPLES

The following examples are provided for illustrating one or more embodiments of the present invention and should not be construed as limiting the invention.

Unless otherwise defined, the technical terms used in the following embodiments have the same meaning as commonly understood by those skilled in the art to which this invention pertains. The test reagents used in the following embodiments, unless otherwise specified, are conventional reagents; the said experimental methods, unless otherwise specified, are conventional methods.

In the examples, three inventive composite sheet materials were prepared and evaluated for increases in surface roughness and surface area after undergoing the projection forming process. The inventive examples were compared to identical composite sheets that were not subject to the projection forming process.

Surface roughness and surface areas of the samples were evaluated with a 4K Ultra High-Accuracy Digital Microscope, VHX-7000 Series available from Keyence utilizing "VHX", Standard Keyence software, version 18.12.04.0A. The magnification was set at 100× and the sample size was 100 $mm^2$.

Abrasion Resistance was evaluated in accordance with 1300 Series Martindale Abrasion and Piling Test. The following materials were used in the evaluation: 9 kPa weights; 80 rub cycles; Speed 47.5 rpm; Sample Size 140 mm diameter.

Standard Abradant, Item number: 86045K21-50A Description: 24×24" sheet of 1/32 #thick FDA compliant silicone rubber (supplied by McMaster Carr).

Standard Felt, Mass 22+/−1.5 oz/yd2 (750+/−50 $g/m^2$) and 0.12+0.01 in (3+/−0.3 mm) thick. (supplied by James Heal).

Polyurethane Foam Backing, 0.12+/−0.04 in (3+/−0.01 mm) thick, 1.94 lbf/ft3 (29 to 31 $kg/m^3$) density, and 38.23 to 47.22 lbf (170 to 210 N) hardness. (Supplied by James Heal).

The weight of each sample was measured with an analytical balance obtained from Mettler Toleto (XPE205).

The liquid pick up and holding capacity of the example composite sheets were also evaluated. In this test, a liquid comprising a drinking yogurt was used. The drinking yogurt was evaluated at room temperature (23° C.) and surface tension 51 mN/m measured by a manual tensiometer from Krüss. The size of each test sample was 10×10 cm. Each sample was measured with an analytical balance from Mettler Toleto (XPE205) and recorded. After the weight recorded, the sample is placed on a bath for 30 seconds, and later the sample hung for dripping. The gross weight of each sample was then measured again.

Pick-up weigh is the difference between the weight of each sample weight before drip hanging and following 30 seconds of drip hanging difference between before and after the 30 seconds hanging for dripping.

The holding weight is the difference between the sample weight before hanging and after the sample has drip hung for 180 seconds.

Coefficient of Friction was measured in accordance with ASTO D 1894. The following parameters were used:

Crosshead speed 127 mm/min;

Test length 130 mm;

Sled size: 6.4 cm×6.4 cm;

Sled weight: 195.3 g;

String: Nylon fishing line;

Load Cell=100N; and

Results for NW/NW of the invectives samples (covering the sled) are from sliding projection side against control sample on platform.

Basis weights of the samples were measured in accordance with test method QE™-080.

Calipers were measured in accordance with test method QE™-014A.

Materials Used

"PP-1": refers to a metallocene catalyzed polypropylene homopolymer having an MFR of 1,800 g/10 min available from LyondellBassell under the product name METOCENE™ MF650Y.

"PP-2": refers to a metallocene catalyzed polypropylene homopolymer having an MFR of 500 g/10 min available from LyondellBassell under the product name METOCENE™ MF650W.

"SMS" refers to an internal layer obtained from Fitesa Mexico under the product code SMS PP OE PHOBIC and having a spunbond/spunbond/meltblown/meltblown/spunbond configuration. The total basis weight of the SMS was 12 $g/m^2$ in which each spunbond layer had a basis weight of 3.5 $g/m^2$ and each meltblown layer had a basis weight of 0.8 $g/m^2$.

Control Example 1

Control Example 1 comprised a composite sheet comprising two identical meltblown nonwoven layers. The meltblown layers were prepared with a Kasen meltblown spin beam. Both meltblown layers comprised meltblown fibers of PP-1 and had basis weights of 15 $g/m^2$. The composite sheet had a collective basis weight of 30 $g/m^2$. The composite sheet of Control Example 1 was not subject further bonded and not subjected to the projection formation process.

Inventive Example 1

Figure 8:
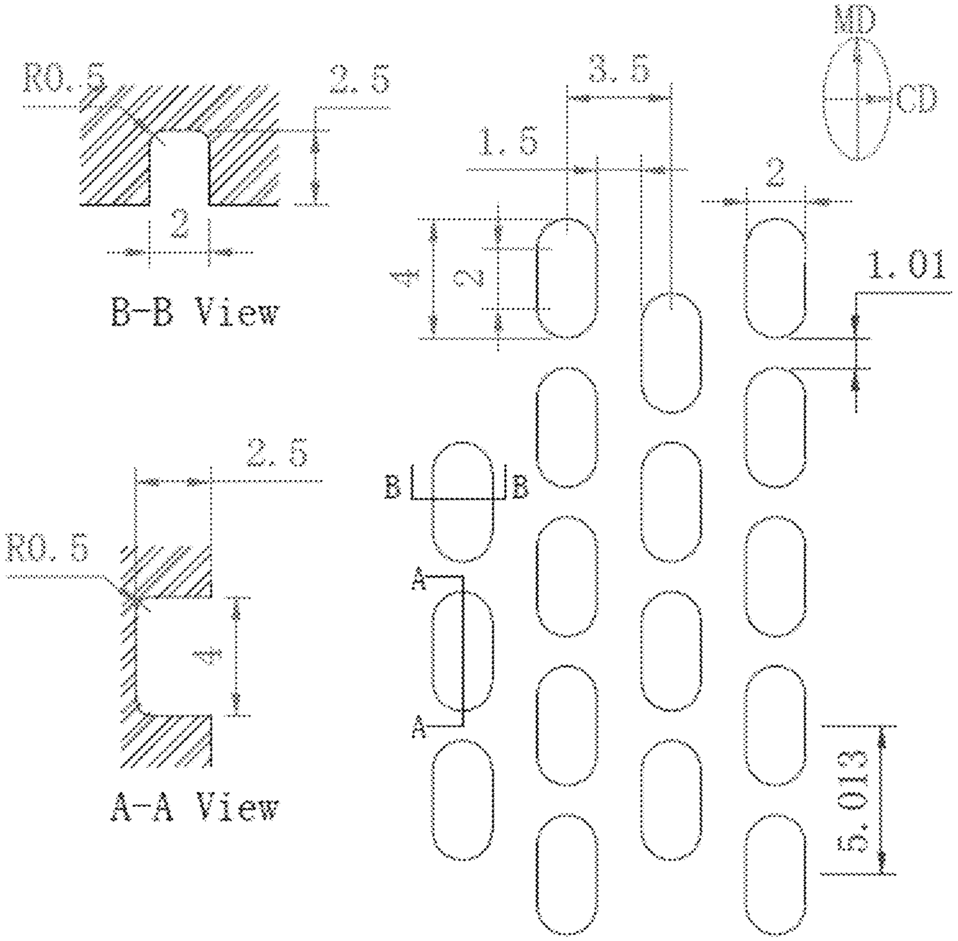
FIGS. 8 and 9 show protuberances and corresponding recesses for of a roll assembly for preparing a composite sheet having a three-dimensional topography.
Figure 9:
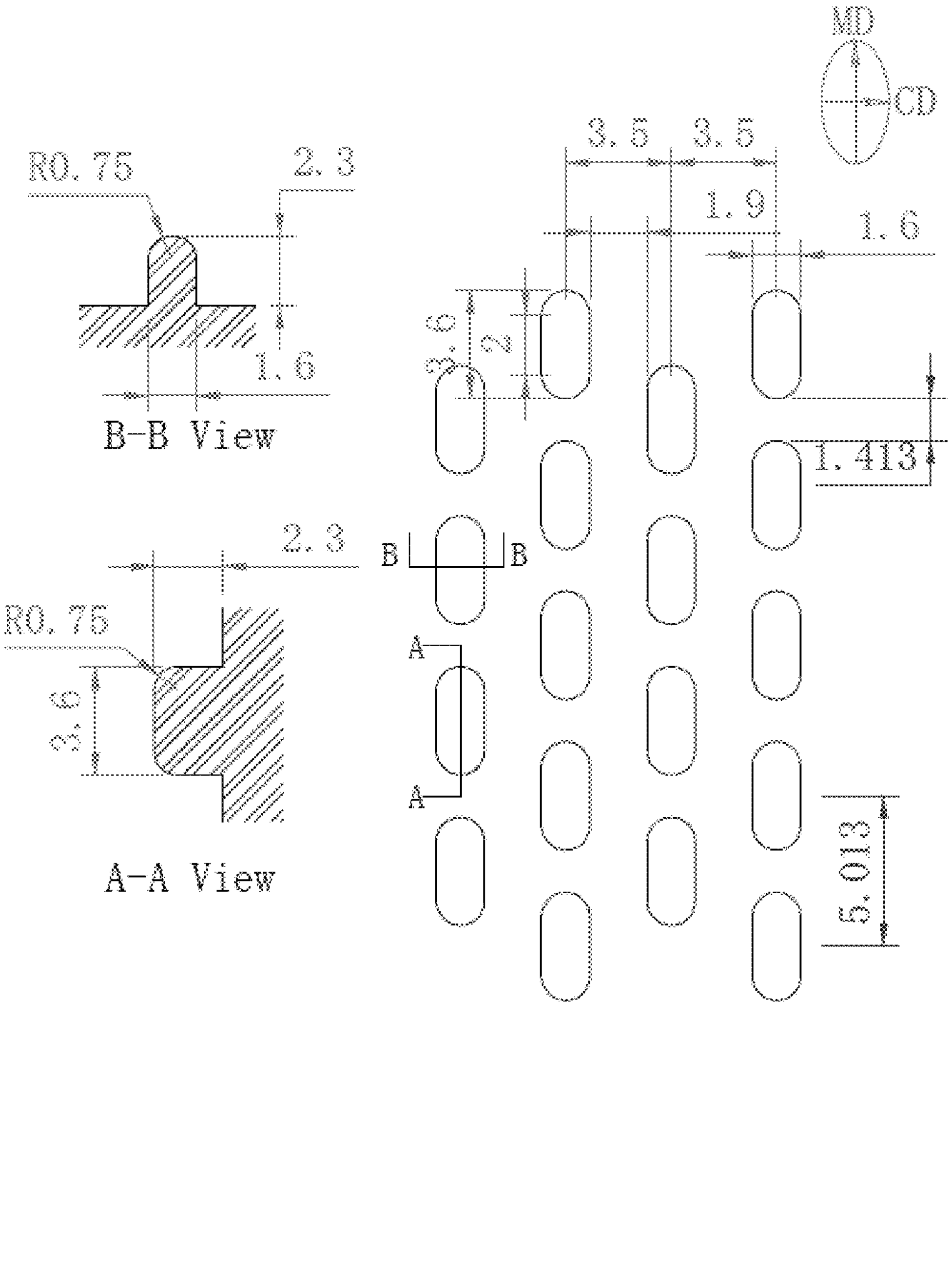

In Inventive Example 1, a portion of Control Example 1 was subjected to the projection formation process by subjecting the sample to a roll assembly comprising a first roll having a plurality of outwardly extending protuberances and a second cooperating roll having a plurality of recesses configured to receive a corresponding protuberance therein. FIGS. 8 and 9 provide details the dimensions (in mm) of the recesses and protuberances, respectively. The protuberances and recesses were oriented lengthwise in the machine direction of the roll assembly. The roll having the protuberances was heated to a temperature of 120° C., and the roll having the cavities was heated to a temperature of 131° C. The depth of engagement of the protuberances in the recesses was approximately 2.1 mm. Following the projection formation process, the surface of the sample having the projections were evaluated for roughness and surface area.

Control Example 2

Control Example 2 comprised a composite sheet comprising two identical meltblown nonwoven layers with an SMS layer sandwiched therebetween. The meltblown layers were prepared with a Kasen meltblown spin beam. Both meltblown layers comprised meltblown fibers of PP-1 and had basis weights of 11 $g/m^2$. The composite sheet had a collective basis weight of 34 $g/m^2$. The composite sheet of Control Example 2 was calender bonded and not subjected to the projection formation process.

Inventive Example 2

In Inventive Example 2, a portion of Control Example 2 was subjected to the projection formation process by subjecting the sample to a roll assembly comprising a first roll having a plurality of outwardly extending protuberances and a second cooperating roll having a plurality of recesses configured to receive a corresponding protuberance therein. The protuberances and recesses were oriented lengthwise in the machine direction of the roll assembly. The roll having the protuberances was heated to a temperature of 120° C., and the roll having the cavities was heated to a temperature of 131° C. The depth of engagement of the protuberances in the recesses was approximately 2.1 mm. Following the projection formation process, the surface of the sample having the projections was evaluated for roughness and surface area.

Control Example 3

Control Example 3 comprised a composite sheet comprising a first meltblown nonwoven layer having a fine meltblown surface, a second meltblown nonwoven layer having a scrubby exterior surface, and an SBS layer sandwiched therebetween. The fine meltblown layer were prepared with a Kasen meltblown spin beam and the scrubby meltblown layer was prepared with a J & M meltblown spinbeam. The fine meltblown layer comprised meltblown fibers of PP-1 and had a basis weight of 11 $g/m^2$. The abrasive meltblown layer comprised meltblown fibers of PP-2 and had basis weights of 11 $g/m^2$. The PP-2 polypropylene resin was blended with minor proportions of a red pigmented polypropylene resin. The composite sheet had a collective basis weight of 34 $g/m^2$. During meltblown fiber formation of the abrasive meltblown layer, the temperature of the blown air was approximately 177° C., and the distance from the die tip to the collection surface was approximately 43 cm. The composite sheet of Control Example 3 was calender bonded and not subjected to the projection formation process.

Inventive Example 3

Figure 10:
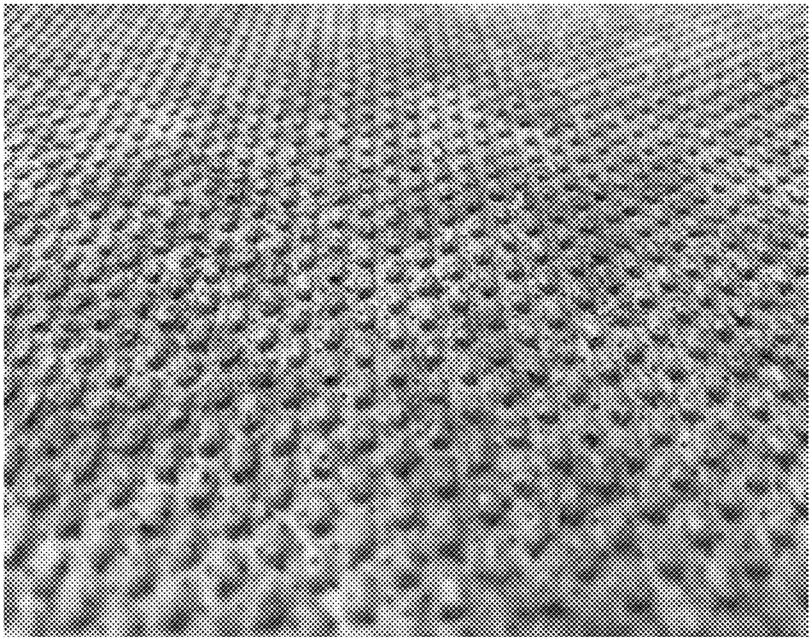
FIG. 10 is a magnified image of the exterior surface of a composite sheet in accordance with at least one embodiment of the invention.

In Inventive Example 3, a portion of Control Example 3 was subjected to the projection formation process by subjecting the sample to a roll assembly comprising a first roll having a plurality of outwardly extending protuberances and a second cooperating roll having a plurality of recesses configured to receive a corresponding protuberance therein. The protuberances and recesses were oriented lengthwise in the machine direction of the roll assembly. The roll having the protuberances was heated to a temperature of 125° C., and the roll having the cavities was heated to a temperature of 134° C. The depth of engagement of the protuberances in the recesses was approximately 2.1 mm. Following the projection formation process, the surface of the sample having the projections was evaluated for roughness and surface area. FIG. 10 is a magnified image of the scrubby surface of the composite fabric.

The surface roughness of the layer having the projections of each of the samples was evaluated and the results are provided in Table 1, below.

TABLE 1

Surface Roughness Evaluation

| Example No. | Basis weight (gsm) | Caliper (mm) | Ra MD (μM) | Ra CD (μM) | Rz MD (μM) | Rz CD (μM) | Sa (μM) | Sz (μM) |
|---|---|---|---|---|---|---|---|---|
| Control Example 1 | 34 | 0.34 | 14.3 | 15.4 | 81.8 | 91.5 | 16.4 | 147.3 |
| Inventive Example 1 | 34 | 1.3 | 309.3 | 507.6 | 939.5 | 1462.6 | 519.8 | 1,464.1 |
| Control Example 2 | 34 | 0.26 | 30.1 | 29.7 | 149.7 | 171.7 | 29.6 | 221.3 |
| Inventive Example 2 | 34 | 1.06 | 219.2 | 383.0 | 752.7 | 1,223.6 | 383 | 1,292.5 |
| Control Example 3 | 34 | 0.63 | 94.3 | 91.9 | 480 | 484.6 | 69.6 | 560.9 |
| Inventive Example 3 | 34 | 0.97 | 224.3 | 361.5 | 927.3 | 1,270.3 | 344.2 | 1,446.2 |

Based on the average of 10 measurements

The surface areas of the surfaces of the inventive examples that had undergone the projection forming process were also evaluated and compared to the control examples, which were not subject to the projection forming process. The results are provided in Table 2, below.

TABLE 2

Surface Area and Volume Evaluation

| Example No. | Basis weight (gsm) | Caliper (mm) | Surface area ($mm^2$) | Projection Volume ($mm^3$) | Surface Void Volume ($mm^3$ per 100 $mm^2$) |
|---|---|---|---|---|---|
| Control Example 1 | 34 | 0.34 | 25.76 | 2.97 | — |
| Inventive Example 1 | 34 | 1.3 | 38.1 | 17.67 | 17.3 |
| Control Example 2 | 34 | 0.26 | 26.66 | 3.66 | — |
| Inventive Example 2 | 34 | 1.06 | 33.37 | 13.29 | 12.7 |
| Control Example 3 | 34 | 0.63 | 42.29 | 7.02 | — |
| Inventive Example 3 | 34 | 0.97 | 47.96 | 14.30 | 13.7 |

Based on the average of 10 measurements

Table 3, below, summarizes increase in surface areas of the exterior surface of the Inventive Examples in comparison to the Control Examples following the projection formation process. The values provided in Table 3 were calculated based on the results provided in Table 2.

TABLE 3

Increase in Surface Area and Caliper of Inventive Examples 1-3

| Example No. | Increase in Caliper (%) | Percent Difference in Caliper (%) | Increase in Surface Area (%) | Percent Difference in Surface Area (%) |
|---|---|---|---|---|
| Inventive Example 1 | 282.4 | 117.1 | 47.9 | 38.5 |
| Inventive Example 2 | 307.7 | 119.4 | 25.2 | 22.4 |
| Inventive Example 3 | 54.0 | 42.5 | 13.4 | 12.6 |

In addition to evaluating the roughness of the surface layer having the projections, the Shore Hardness A of the exterior surfaces of the composite sheet material of Inventive Example 3 was also evaluated. The Shore Hardness A was evaluated with a Shore Instrument & MFG. Co. Inc. Durometer Type A, ASTM D2240 gauge. A total of 10 measurements were taken for each surface of the composite sheet material. The surface comprising the fine meltblown fibers exhibited a Shore Hardness A of 45, and the surface having the plurality of projections exhibited a Shore Hardness A of 50, which represents an 11% increase in hardness and a percent difference of 10.5%.

Table 4, below, summarizes the improvements in abrasion resistance of the Inventive Examples in comparison to the Control Examples following the projection formation process.

TABLE 4

Comparison of Abrasion Resistance of Inventive Examples 1-3

| Example No. | Weight Prior to Testing (g) | Weight Following Testing (g) | Change in Weight (g) | Result/ Observations |
|---|---|---|---|---|
| Control Example 1 | 0.51 | Completely Damaged | Damaged/Nom-Useable | n/a |
| Inventive Example 1 | 0.5105 | 0.5105 | 0.0 | No Fiber Loss |
| Control Example 2 | 0.5105 | 0.4955 | 0.015 | 3% fiber loss |
| Inventive Example 2 | 0.5105 | 0.5105 | 0.0 | No Fiber Loss |

TABLE 4-continued

Comparison of Abrasion Resistance of Inventive Examples 1-3

| Example No. | Weight Prior to Testing (g) | Weight Following Testing (g) | Change in Weight (g) | Result/ Observations |
|---|---|---|---|---|
| Control Example 3 | 0.5490 | 0.5390 | 0.010 | 2% Fiber Loss |
| Inventive Example 3 | 0.5105 | 0.5105 | 0.0 | No Fiber Loss |

All Values Based on the average of 4 measurements

A comparison of Inventive Example 1 and Control Example 1 shows that the inventive examples have more abrasion resistance and durability. As noted in Table 4, Control Example 1 was completely damaged and unusable after 8 cycles indicating that the inventive examples have improved durability which is important for a scrubbing surface.

Figure 11:
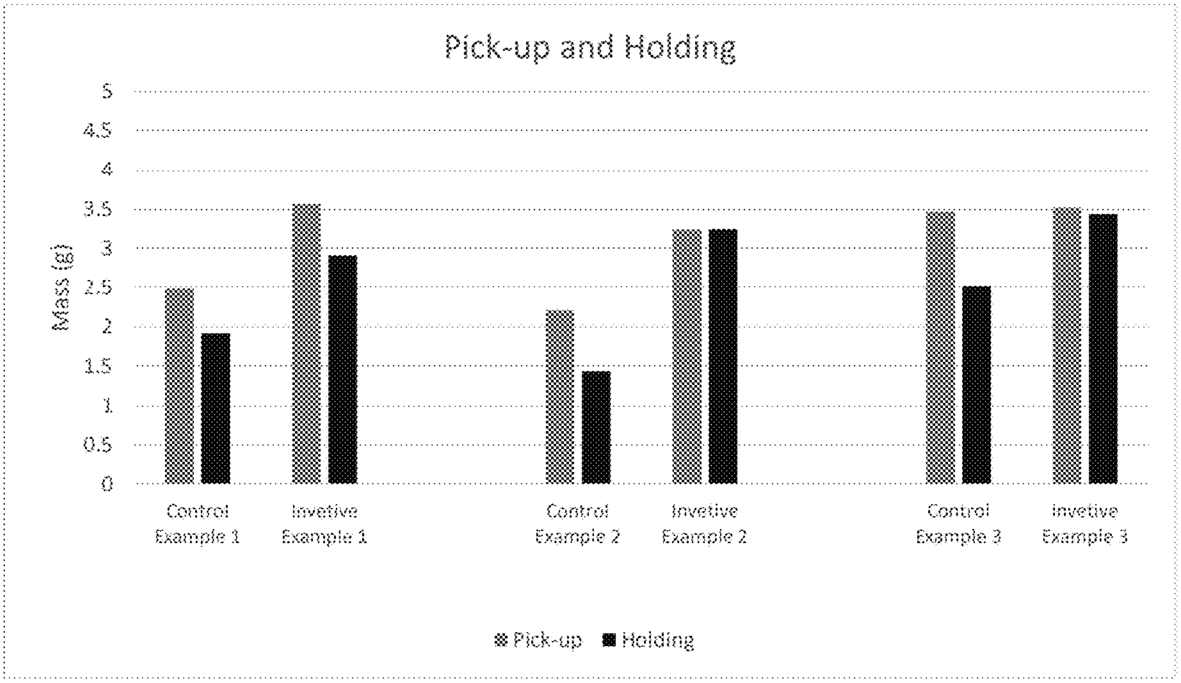
FIG. 11 is a bar graph illustrating improvements in liquid pick-up and holding capacity of composite sheets in accordance with at least one embodiment of the invention.

The Inventive Examples were also evaluated for pick up and holding capacity in comparison to the Control Samples. The results are provided graphically in the bar graph of FIG. 11 and Table 5, below. As can be seen in FIG. 11, the Inventive Examples exhibited significant improvements in both liquid pick-up capacity and holding capacity in comparison to the corresponding control samples.

TABLE 5

Pick-Up and Holding Capacity

| Example No. | Liquid Pick-Up (g) | Liquid Holding (g) | Difference in Liquid Pick-Up Capacity (g) | % Increase in Liquid Pick-Up Capacity | Difference in Liquid Holding Capacity (g) | % Increase in Liquid Holding Capacity |
|---|---|---|---|---|---|---|
| Control Example 1 | 2.5 | 1.9 | N/A | N/A | N/A | N/A |
| Inventive Example 1 | 3.55 | 2.9 | 1.05 | 42 | 1.0 | 52.6 |
| Control Example 2 | 2.2 | 1.4 | N/A | N/A | N/A | N/A |
| Inventive Example 2 | 3.25 | 3.25 | 1.05 | 47.7 | 1.85 | 132 |
| Control Example 3 | 3.45 | 2.5 | N/A | N/A | N/A | N/A |
| Inventive Example 3 | 3.55 | 3.45 | 0.1 | 2.9 | 0.95 | 38 |

All Values Based on the average of 4 measurements/Values are approximates based on the values provided in FIG. 11. Differences in Pick-up and Holding Capacities are between the inventive example and corresponding control example.

In particular, the Inventive Examples demonstrated an average increase in liquid pick up capacity of 30.1% in comparison to the identical control samples that did not include the projections formed on the surface. It is noted that Inventive Example 3 only included a minor increase in liquid pick-up capacity in comparison to Control Example 3. In view of this slight increase, this result may be an anomalous result. In comparison, the average increase for Inventive Examples 1 and 2 was 44.9% in comparison to the to the control examples, which were not subject to the projection forming process.

With respect to the liquid holding capacity, the inventive examples also demonstrated improvements in comparison to the control examples. In particular, the Inventive Examples each demonstrated an average % increase from about 50 to 135% in liquid holding capacity in comparison to the control samples. In addition, the average % increase of all three inventive examples was 74.2% in comparison to the identical control samples that did not include the projections formed on the surface.

The Coefficient of Friction (CoF) for each Inventive Example was also evaluated and compared to the Control Examples. The results are provided in Table 6, below.

TABLE 6

Evaluation of the Coefficient of Friction

| Measurements | Control Example 1 | Inventive Example 1 | Control Example 2 | Inventive Example 2 | Control Example 3 | Inventive Example 3 |
|---|---|---|---|---|---|---|
| Nw covering the sled against Nw (1) | | | | | | |
| Static CoF MD | 0.73 | 0.56 | 1.48 | 1.43 | 1.04 | 0.72 |
| Static CoF CD | 0.86 | 0.70 | 1.40 | 1.48 | 1.09 | 0.84 |
| Kinetic CoF MD | 0.60 | 0.54 | 1.07 | 1.07 | 0.86 | 0.52 |
| Kinetic CoF CD | 0.67 | 0.60 | 1.00 | 1.12 | 0.92 | 0.71 |
| Nw covering the sled against Smooth Steel (2) | | | | | | |
| Static CoF MD | 0.18 | 0.15 | 0.13 | 0.13 | 0.26 | 0.18 |
| Static CoF CD | 0.17 | 0.14 | 0.14 | 0.13 | 0.24 | 0.19 |
| Kinetic CoF MD | 0.12 | 0.11 | 0.11 | 0.11 | 0.15 | 0.13 |
| Kinetic CoF CD | 0.11 | 0.10 | 0.11 | 0.11 | 0.13 | 0.12 |

Based on the Average of 6 measurements.

(1) Bottom of sled covered with sample side facing down against a surface covered by a second layer of the control sample.

(2) Bottom of sled covered with sample side facing down against a surface of smooth steel.

In the above examples of Table 6, the Inventive Examples demonstrated a reduction in the Coefficient of Friction. It is believed that this reduction may be a result of the gaps between adjacent projections, which results in a decrease in surface contact with the testing device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A composite sheet material suitable for use as a wipe comprising a first meltblown layer comprised predominately of polypropylene, and having an exterior surface characterized by a repeating pattern comprising a plurality of spaced-apart projections defining a three-dimensional topography characterized by the plurality of spaced-apart projections extending outwardly from said exterior surfaces and a plurality of valleys disposed therebetween; and a second meltblown layer comprised predominately of polypropylene, and wherein the first meltblown layer has a machine direction (MD) Roughness (Rz) from about 600 to 1100 μm.

2. The composite sheet material according to claim 1, wherein the first and second meltblown layers comprise fine meltblown fibers.

3. The composite sheet material according to claim 1, wherein the exterior surface of the first meltblown layer defines a scrubby surface of the composite sheet material.

4. The composite sheet material according to claim 1, wherein the exterior surface of the first meltblown layer has a machine direction (MD) Arithmetic Average Roughness (Ra) from about 100 to 500 μm.

5. The composite sheet material according to claim 1, wherein the exterior surface of the first meltblown layer has a cross direction (CD) Roughness (Ra) from about 250 to 750 μm.

6. The composite sheet material according to claim 1, wherein the exterior surface of the first meltblown layer has a cross direction (CD) Roughness (Rz) from about 800 to 1600 μm.

7. The composite sheet material according to claim 1, wherein the first meltblown layer comprises a polypropylene polymer having a melt flow rate MFR from about 400 to 650 g/10 min.

8. The composite sheet material according to claim 7, wherein the second meltblown layer comprises a polypropylene polymer having a melt flow rate MFR ranging from about 1,100 to 2,000 g/10 min.

9. The composite sheet material according to claim 1, wherein the projections have a height ranging from about 0.5 to 2.5 mm.

10. The composite sheet material according to claim 1, wherein a number of projections per $m^2$ is from about 5,000 to 7,000.

11. The composite sheet material according to claim 1, wherein the projections have a volume from about 10 to 30 $mm^3$.

12. The composite sheet material according to claim 1, wherein, the plurality of valleys are interconnected and define a surface void volume of the exterior surface of the first meltblown layer from about 10 to 25 $mm^3$ per 100 $mm^2$.

13. The composite sheet material according to claim 1, further comprising a functional layer disposed between the first and second meltblown layers.

14. The composite sheet material according to claim 13, wherein the functional layer comprises one or more of a spunbond layer, a meltblown layer, a carded nonwoven layer, and an airlaid nonwoven layer.

15. The composite sheet material according to claim 13, wherein the functional layer comprises a composite having a spunbond/meltblown/spunbond configuration.

16. The composite sheet material according to claim 13, wherein the functional layer comprises a composite having a spunbond/spunbond/meltblown/meltblown/spunbond configuration.

17. The composite sheet material according to claim 1, wherein the exterior surface of the first meltblown layer exhibits an increase in surface area of at least 10% in comparison to an identical composite sheet that has not undergone a process of projection formation on a surface thereof.

18. The composite sheet material according to claim 1, wherein an exterior surface of the first meltblown layer comprising the plurality of projections exhibits an increase in surface area ranging from about 10 to 95% in comparison to an identical composite sheet that has not undergone a process of projections formation on a surface thereof.

19. The composite sheet material according to claim 1, wherein the basis weight of the composite sheet material is from about 15 grams per square meter ($g/m^2$) to 100 $g/m^2$.

20. A wiper comprising the composite sheet material of claim 1.

21. A wiper comprising a composite sheet material comprising of a first meltblown layer composed predominately of a polypropylene resin having an MFR ranging from about 400 to 650 g/10 min., and a second meltblown layer predominately comprising a polypropylene resin having an MFR ranging from about 1,100 to 2,000 g/10 min., and wherein an exterior surface of the first meltblown layer exhibits a Shore Hardness A that is at least 10% greater than the Shore Hardness A of an exterior surface of the second meltblown layer, and wherein the first meltblown layer has a machine direction (MD) Roughness (Rz) from about 600 to 1100 μm.

22. The wiper according to claim 21, wherein the first meltblown layer further comprises an exterior surface characterized by a repeating pattern comprising a plurality of spaced-apart projections defining a three-dimensional topography characterized by the plurality of spaced-apart projections extending outwardly from said exterior surfaces and a plurality of valleys disposed therebetween.

* * * * *